US010369998B2

(12) United States Patent
Kuszmaul et al.

(10) Patent No.: US 10,369,998 B2
(45) Date of Patent: Aug. 6, 2019

(54) DYNAMIC GAP CONTROL FOR AUTOMATED DRIVING

(71) Applicant: Peloton Technology, Inc., Mountain View, CA (US)

(72) Inventors: James B. Kuszmaul, Mountain View, CA (US); Austin B. Schuh, Los Altos, CA (US); Stephen M. Erlien, Mountain View, CA (US); Joshua P. Switkes, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 204 days.

(21) Appl. No.: 15/605,456

(22) Filed: May 25, 2017

(65) Prior Publication Data

US 2018/0050697 A1   Feb. 22, 2018

Related U.S. Application Data

(60) Provisional application No. 62/489,662, filed on Apr. 25, 2017, provisional application No. 62/377,970, filed on Aug. 22, 2016.

(51) Int. Cl.
*B60W 30/165* (2012.01)
*B60W 10/04* (2006.01)
(Continued)

(52) U.S. Cl.
CPC .......... *B60W 30/165* (2013.01); *B60W 10/04* (2013.01); *B60W 10/18* (2013.01);
(Continued)

(58) Field of Classification Search
CPC ............................. G05D 1/021; B60W 30/165
See application file for complete search history.

(56) References Cited

U.S. PATENT DOCUMENTS 3,725,921 A   4/1973 Weidman et al.
4,370,718 A   1/1983 Chasek
(Continued)

FOREIGN PATENT DOCUMENTS

DE   102011002275   10/2012
EP        3316064    5/1918
(Continued)

OTHER PUBLICATIONS

Klaus et al., U.S. Appl. No. 15/860,024, filed Jan. 3, 2018.
(Continued)

*Primary Examiner* — Hussein Elchanti
*Assistant Examiner* — Michael A Berns
(74) *Attorney, Agent, or Firm* — Beyer Law Group LLP

(57) ABSTRACT

A variety of methods, controllers and algorithms are described for controlling a vehicle to closely follow one another safely using automatic or partially automatic control. The described control schemes are well suited for use in vehicle platooning and/or vehicle convoying applications, including truck platooning and convoying controllers. In one aspect, a power plant (such as an engine) is controlled using a control scheme arranged to attain and maintain a first target gap between the vehicles. Brakes (such as wheel brakes) are controlled in a manner configured to attain and maintain a second (shorter) target gap. Such control allows a certain degree of encroachment on the targeted gap (sometimes referred to as a gap tolerance) before the brakes are actuated. The described approaches facilitate a safe and comfortable rider experience and reduce the likelihood of the brakes being actuated unnecessarily.

19 Claims, 8 Drawing Sheets

(51) Int. Cl.
*B60W 10/18* (2012.01)
*G05D 1/02* (2006.01)
*G08G 1/00* (2006.01)
*G01S 19/14* (2010.01)
*G01S 13/93* (2006.01)
*G01S 19/13* (2010.01)
*G08G 1/16* (2006.01)

(52) U.S. Cl.
CPC .............. *G01S 13/93* (2013.01); *G01S 19/14* (2013.01); *G05D 1/0293* (2013.01); *G05D 1/0295* (2013.01); *G08G 1/22* (2013.01); *B60W 2420/52* (2013.01); *B60W 2520/28* (2013.01); *B60W 2540/10* (2013.01); *B60W 2540/12* (2013.01); *B60W 2540/18* (2013.01); *B60W 2710/09* (2013.01); *B60W 2710/18* (2013.01); *B60W 2750/308* (2013.01); *B60W 2750/40* (2013.01); *G01S 19/13* (2013.01); *G01S 2013/9325* (2013.01); *G08G 1/161* (2013.01)

(56) References Cited

U.S. PATENT DOCUMENTS

| | | |
|---|---|---|
| 5,166,881 A | 11/1992 | Akasu |
| 5,295,551 A | 3/1994 | Sukonick |
| 5,331,561 A | 7/1994 | Barrett et al. |
| 5,493,302 A * | 2/1996 | Woll .................. B60K 31/0008 342/109 |
| 5,572,449 A | 11/1996 | Ting et al. |
| 5,633,456 A | 5/1997 | Stander |
| 5,680,122 A | 10/1997 | Mio |
| 5,777,451 A | 7/1998 | Kobayashi et al. |
| 5,781,119 A | 7/1998 | Yamashita et al. |
| 5,815,825 A | 9/1998 | Tachibana et al. |
| 5,880,958 A | 3/1999 | Helms et al. |
| 6,032,097 A | 2/2000 | Iihoshi et al. |
| 6,125,321 A | 9/2000 | Tabata et al. |
| 6,128,559 A | 10/2000 | Saitou et al. |
| 6,188,950 B1 | 2/2001 | Tsutsumi et al. |
| 6,265,990 B1 | 7/2001 | Isogai et al. |
| 6,285,929 B1 | 9/2001 | Hashimoto |
| 6,345,603 B1 | 2/2002 | Abboud et al. |
| 6,356,820 B1 | 3/2002 | Hashimoto et al. |
| 6,370,470 B1 * | 4/2002 | Yamamura .......... B60K 31/0008 180/170 |
| 6,397,149 B1 | 5/2002 | Hashimoto |
| 6,418,370 B1 | 7/2002 | Isogai et al. |
| 6,484,078 B1 | 11/2002 | Kageyama |
| 6,510,381 B2 | 1/2003 | Grounds et al. |
| 6,604,038 B1 | 8/2003 | Lesesky et al. |
| 6,633,006 B1 | 10/2003 | Wolf et al. |
| 6,879,910 B2 | 4/2005 | Shike et al. |
| 6,898,585 B2 | 5/2005 | Benson et al. |
| 6,963,795 B2 | 11/2005 | Haissig et al. |
| 6,975,246 B1 | 12/2005 | Trudeau |
| 7,286,825 B2 | 10/2007 | Shishido et al. |
| 7,460,951 B2 | 12/2008 | Altan et al. |
| 7,554,435 B2 | 6/2009 | Tengler et al. |
| 7,593,811 B2 | 9/2009 | Schmidt et al. |
| 7,596,811 B2 | 9/2009 | Schmidt et al. |
| 7,729,823 B2 | 6/2010 | Ruoppolo |
| 7,782,227 B2 | 8/2010 | Boss et al. |
| 7,831,345 B2 | 11/2010 | Heino et al. |
| 7,894,982 B2 | 2/2011 | Reeser et al. |
| 8,026,833 B2 | 9/2011 | Villaume et al. |
| 8,073,574 B2 | 12/2011 | Yamamoto et al. |
| 8,116,921 B2 | 2/2012 | Ferrin et al. |
| 8,139,109 B2 | 3/2012 | Broggi et al. |
| 8,224,551 B2 | 7/2012 | Grolle et al. |
| 8,275,491 B2 | 9/2012 | Ferrin et al. |
| 8,326,473 B2 | 12/2012 | Simpson et al. |
| 8,352,111 B2 | 1/2013 | Mudalige |
| 8,352,112 B2 | 1/2013 | Mudalige |
| 8,354,955 B2 | 1/2013 | Miyake et al. |
| 8,442,735 B2 | 5/2013 | Hrovat et al. |
| 8,538,656 B2 | 9/2013 | Yamashiro |
| 8,554,468 B1 | 10/2013 | Bullock |
| 8,618,922 B2 | 12/2013 | Debouk et al. |
| 8,620,517 B2 | 12/2013 | Caveney et al. |
| 8,660,779 B2 | 2/2014 | Shida |
| 8,666,587 B2 | 3/2014 | Anderson |
| 8,676,466 B2 | 3/2014 | Mudalige |
| 8,682,511 B2 | 3/2014 | Andreasson |
| 8,688,349 B2 | 4/2014 | Grolle et al. |
| 8,738,238 B2 | 5/2014 | Rekow |
| 8,744,666 B2 | 6/2014 | Switkes et al. |
| 8,775,060 B2 | 7/2014 | Solyom et al. |
| 8,798,907 B2 | 8/2014 | Shida |
| 8,947,531 B2 | 2/2015 | Fischer et al. |
| 8,948,995 B2 | 2/2015 | Pandita et al. |
| 8,954,272 B2 | 2/2015 | Adam et al. |
| 8,970,401 B2 | 3/2015 | Molander et al. |
| 8,972,147 B2 * | 3/2015 | Taneyhill .......... B60K 31/0008 701/96 |
| 9,037,389 B2 | 5/2015 | You |
| 9,079,587 B1 | 7/2015 | Rupp et al. |
| 9,141,112 B1 | 9/2015 | Loo et al. |
| 9,145,137 B2 | 9/2015 | Doi et al. |
| 9,174,672 B2 | 11/2015 | Zeng et al. |
| 9,221,396 B1 | 12/2015 | Zhu et al. |
| 9,224,300 B2 | 12/2015 | Lee et al. |
| 9,355,423 B1 | 5/2016 | Slusar |
| 9,367,065 B2 | 6/2016 | Dolgov et al. |
| 9,396,661 B2 | 7/2016 | Okamoto |
| 9,423,794 B2 * | 8/2016 | Lind .................... G05D 1/0278 |
| 9,449,258 B1 | 9/2016 | Palacio et al. |
| 9,460,622 B1 | 10/2016 | Ferguson et al. |
| 9,494,944 B2 | 11/2016 | Alam et al. |
| 9,582,006 B2 | 2/2017 | Switkes et al. |
| 9,598,078 B2 | 3/2017 | Moran et al. |
| 9,613,466 B1 | 4/2017 | Bullock |
| 9,616,743 B1 | 4/2017 | Mays et al. |
| 9,632,507 B1 | 4/2017 | Korn |
| 9,645,579 B2 | 5/2017 | Switkes et al. |
| 9,665,102 B2 | 5/2017 | Switkes et al. |
| 9,721,474 B2 | 8/2017 | Eskilson |
| 9,771,070 B2 | 9/2017 | Zagorski et al. |
| 9,799,224 B2 | 10/2017 | Okamoto |
| 9,823,166 B2 | 11/2017 | Dudar et al. |
| 9,852,475 B1 | 12/2017 | Konrardy et al. |
| 9,878,657 B2 | 1/2018 | Wunsche, III et al. |
| 9,884,631 B2 | 2/2018 | James et al. |
| 9,927,816 B2 | 3/2018 | Li et al. |
| 9,928,746 B1 | 3/2018 | MacNeille et al. |
| 9,940,840 B1 | 4/2018 | Schubert et al. |
| 10,017,039 B1 | 7/2018 | Colavincenzo |
| 10,017,179 B2 | 7/2018 | Alden et al. |
| 10,027,024 B2 | 7/2018 | Powell |
| 2001/0001138 A1 | 5/2001 | Zhu et al. |
| 2002/0077748 A1 | 6/2002 | Nakano |
| 2002/0152015 A1 | 10/2002 | Seto |
| 2002/0198632 A1 | 12/2002 | Breed et al. |
| 2003/0094858 A1 | 5/2003 | Shiue et al. |
| 2004/0046448 A1 | 3/2004 | Brown |
| 2004/0078133 A1 | 4/2004 | Miller et al. |
| 2004/0140143 A1 | 7/2004 | Saeki |
| 2004/0245853 A1 | 12/2004 | Odagawa et al. |
| 2004/0252863 A1 | 12/2004 | Chang et al. |
| 2006/0074557 A1 | 4/2006 | Mulligan et al. |
| 2006/0095195 A1 | 5/2006 | Nishimura et al. |
| 2006/0106534 A1 | 5/2006 | Kawamata et al. |
| 2006/0161341 A1 | 7/2006 | Haegebarth et al. |
| 2006/0229804 A1 | 10/2006 | Schmidt et al. |
| 2007/0027614 A1 | 2/2007 | Reeser et al. |
| 2007/0043502 A1 | 2/2007 | Mudalige et al. |
| 2007/0060045 A1 | 3/2007 | Prautzsch |
| 2007/0210953 A1 | 9/2007 | Abraham et al. |
| 2007/0213915 A1 | 9/2007 | Tange |
| 2007/0233337 A1 | 10/2007 | Plishner |
| 2007/0276597 A1 | 11/2007 | Kato et al. |
| 2008/0009985 A1 | 1/2008 | Plishner |

(56) References Cited

U.S. PATENT DOCUMENTS

| | | |
|---|---|---|
| 2008/0033649 A1 | 2/2008 | Hasegawa et al. |
| 2008/0059007 A1 | 3/2008 | Whittaker et al. |
| 2008/0119965 A1 | 5/2008 | McCrary |
| 2008/0122652 A1 | 5/2008 | Tengler et al. |
| 2008/0249667 A1 | 10/2008 | Horvitz et al. |
| 2008/0255722 A1 | 10/2008 | McClellan et al. |
| 2008/0258890 A1 | 10/2008 | Follmer et al. |
| 2009/0012666 A1 | 1/2009 | Simpson et al. |
| 2009/0051510 A1 | 2/2009 | Follmer et al. |
| 2009/0062974 A1 | 3/2009 | Tamamoto et al. |
| 2009/0079839 A1 | 3/2009 | Fischer et al. |
| 2009/0118889 A1 | 5/2009 | Heino et al. |
| 2009/0132142 A1* | 5/2009 | Nowak .............. B60K 31/0008 701/93 |
| 2009/0157461 A1 | 6/2009 | Wright et al. |
| 2009/0164082 A1 | 6/2009 | Kobayashi et al. |
| 2009/0198427 A1 | 8/2009 | Christopher et al. |
| 2009/0222186 A1 | 9/2009 | Jensen |
| 2009/0271083 A1 | 10/2009 | Kumar |
| 2009/0286648 A1 | 11/2009 | Vesenjak |
| 2009/0287412 A1 | 11/2009 | Menzel et al. |
| 2009/0326799 A1 | 12/2009 | Crook |
| 2010/0045507 A1 | 2/2010 | Yamano et al. |
| 2010/0049374 A1 | 2/2010 | Ferrin et al. |
| 2010/0094509 A1 | 4/2010 | Luke et al. |
| 2010/0106356 A1 | 4/2010 | Trepagnier et al. |
| 2010/0194638 A1 | 8/2010 | Rivard |
| 2010/0256835 A1 | 10/2010 | Mudalige |
| 2010/0256836 A1 | 10/2010 | Mudalige |
| 2010/0256852 A1 | 10/2010 | Mudalige |
| 2010/0332101 A1 | 12/2010 | Braunberger et al. |
| 2011/0010022 A1 | 1/2011 | Beavin |
| 2011/0083011 A1 | 4/2011 | DiCrescenzo |
| 2011/0112730 A1 | 5/2011 | Rekow |
| 2011/0118967 A1 | 5/2011 | Tsuda |
| 2011/0184596 A1 | 7/2011 | Andreasson |
| 2011/0184605 A1 | 7/2011 | Neff |
| 2011/0210872 A1 | 9/2011 | Molander |
| 2011/0270514 A1 | 11/2011 | Shida |
| 2011/0270520 A1 | 11/2011 | Kronenberg |
| 2011/0274523 A1 | 11/2011 | Petalas |
| 2011/0301779 A1 | 12/2011 | Shida |
| 2012/0061154 A1 | 3/2012 | Pfister |
| 2012/0089294 A1 | 4/2012 | Fehse et al. |
| 2012/0105270 A1 | 5/2012 | Miyake et al. |
| 2012/0109610 A1 | 5/2012 | Anderson et al. |
| 2012/0123660 A1 | 5/2012 | Kagawa et al. |
| 2012/0139549 A1 | 6/2012 | Sufrin-Disler et al. |
| 2012/0166057 A1 | 6/2012 | Amato et al. |
| 2012/0206282 A1 | 8/2012 | Gorbold |
| 2012/0221235 A1 | 8/2012 | Prudhomme-Lacroix et al. |
| 2012/0226965 A1 | 9/2012 | Hammerschmidt et al. |
| 2012/0239268 A1 | 9/2012 | Chen et al. |
| 2012/0252415 A1 | 10/2012 | Menzel et al. |
| 2012/0259516 A1 | 10/2012 | Grolle et al. |
| 2012/0259538 A1 | 10/2012 | Oexmann |
| 2013/0015984 A1 | 1/2013 | Yamashiro |
| 2013/0018766 A1 | 1/2013 | Christman |
| 2013/0024084 A1 | 1/2013 | Yamashiro |
| 2013/0030606 A1 | 1/2013 | Mudalige et al. |
| 2013/0030657 A1 | 1/2013 | Chatterjee et al. |
| 2013/0041567 A1 | 2/2013 | Yamashiro |
| 2013/0041576 A1 | 2/2013 | Switkes et al. |
| 2013/0066511 A1 | 3/2013 | Switkes et al. |
| 2013/0079953 A1 | 3/2013 | Kumabe |
| 2013/0080040 A1 | 3/2013 | Kumabe |
| 2013/0080041 A1 | 3/2013 | Kumabe |
| 2013/0116861 A1 | 5/2013 | Nemoto |
| 2013/0124064 A1 | 5/2013 | Nemoto |
| 2013/0144502 A1 | 6/2013 | Shida |
| 2013/0151058 A1 | 6/2013 | Zagorski et al. |
| 2013/0173114 A1 | 7/2013 | Pillai |
| 2013/0211624 A1 | 8/2013 | Lind et al. |
| 2013/0218365 A1 | 8/2013 | Caveney et al. |
| 2013/0231820 A1 | 9/2013 | Solyom et al. |
| 2013/0317676 A1 | 11/2013 | Cooper et al. |
| 2013/0325306 A1 | 12/2013 | Caveney et al. |
| 2014/0005875 A1 | 1/2014 | Hartmann et al. |
| 2014/0005906 A1 | 1/2014 | Pandita et al. |
| 2014/0019031 A1 | 1/2014 | Solyom et al. |
| 2014/0100734 A1 | 4/2014 | Yamashiro |
| 2014/0107867 A1 | 4/2014 | Yamashiro |
| 2014/0129075 A1 | 5/2014 | Carleton |
| 2014/0142799 A1 | 5/2014 | Ferguson et al. |
| 2014/0142801 A1 | 5/2014 | Shah |
| 2014/0145838 A1 | 5/2014 | Tuukkanen |
| 2014/0156118 A1 | 6/2014 | Wiemeyer et al. |
| 2014/0172265 A1 | 6/2014 | Funabashi |
| 2014/0197967 A1 | 7/2014 | Modica et al. |
| 2014/0214255 A1 | 7/2014 | Dolgov et al. |
| 2014/0222278 A1 | 8/2014 | Fujita |
| 2014/0236449 A1 | 8/2014 | Horn |
| 2014/0244144 A1 | 8/2014 | You |
| 2014/0249693 A1 | 9/2014 | Stark et al. |
| 2014/0277608 A1 | 9/2014 | Debouk et al. |
| 2014/0303870 A1 | 10/2014 | Switkes et al. |
| 2014/0306799 A1 | 10/2014 | Ricci |
| 2014/0306826 A1 | 10/2014 | Ricci |
| 2014/0309836 A1 | 10/2014 | Ollis |
| 2014/0316671 A1 | 10/2014 | Okamoto |
| 2014/0316865 A1 | 10/2014 | Okamoto |
| 2014/0324339 A1 | 10/2014 | Adam et al. |
| 2014/0350756 A1 | 11/2014 | Schoonmaker et al. |
| 2014/0350793 A1 | 11/2014 | Schrabler et al. |
| 2014/0350835 A1 | 11/2014 | Martin |
| 2015/0012204 A1 | 1/2015 | Breuer et al. |
| 2015/0015267 A1 | 1/2015 | Mueller et al. |
| 2015/0025731 A1 | 1/2015 | Uehara |
| 2015/0061492 A1 | 3/2015 | Braunberger |
| 2015/0100192 A1 | 4/2015 | Lee et al. |
| 2015/0120137 A1 | 4/2015 | Zeng et al. |
| 2015/0151737 A1 | 6/2015 | Birch et al. |
| 2015/0153733 A1 | 6/2015 | Ohmura et al. |
| 2015/0161894 A1 | 6/2015 | Duncan et al. |
| 2015/0262481 A1 | 9/2015 | Selin |
| 2015/0279122 A1 | 10/2015 | Lorenzen |
| 2015/0314790 A1 | 11/2015 | Deragarden et al. |
| 2015/0334371 A1 | 11/2015 | Galera et al. |
| 2015/0356635 A1 | 12/2015 | Thurston |
| 2015/0378722 A1 | 12/2015 | Zuniga-Hernandez |
| 2016/0009284 A1 | 1/2016 | Tokimasa et al. |
| 2016/0009288 A1 | 1/2016 | Yu |
| 2016/0019782 A1 | 1/2016 | Alam et al. |
| 2016/0026187 A1 | 1/2016 | Alam et al. |
| 2016/0054735 A1* | 2/2016 | Switkes .................. G08G 1/22 701/23 |
| 2016/0194014 A1 | 7/2016 | Rajendran |
| 2016/0267796 A1 | 9/2016 | Hiroma et al. |
| 2016/0272207 A1 | 9/2016 | Dolgov et al. |
| 2016/0300186 A1 | 10/2016 | Scharaswak et al. |
| 2016/0359741 A1 | 12/2016 | Cooper et al. |
| 2016/0373261 A1 | 12/2016 | Tschache et al. |
| 2016/0375732 A1 | 12/2016 | Lazar et al. |
| 2017/0011633 A1 | 1/2017 | Boegel |
| 2017/0058477 A1 | 3/2017 | Niroumand |
| 2017/0069203 A1 | 3/2017 | Sharma |
| 2017/0083844 A1 | 3/2017 | Baker et al. |
| 2017/0115666 A1 | 4/2017 | Kolhouse et al. |
| 2017/0122841 A1 | 5/2017 | Dudar et al. |
| 2017/0132299 A1 | 5/2017 | Fox et al. |
| 2017/0146801 A1 | 5/2017 | Stempora |
| 2017/0178536 A1 | 6/2017 | Manci et al. |
| 2017/0186327 A1 | 6/2017 | Uysal et al. |
| 2017/0197615 A1 | 7/2017 | Elie et al. |
| 2017/0227972 A1 | 8/2017 | Sabau |
| 2017/0235316 A1 | 8/2017 | Shattil |
| 2017/0242095 A1 | 8/2017 | Schuh et al. |
| 2017/0261997 A1 | 9/2017 | Switkes et al. |
| 2017/0289864 A1 | 10/2017 | Narasimha et al. |
| 2017/0293296 A1 | 10/2017 | Stenneth et al. |
| 2017/0308097 A1 | 10/2017 | Switkes et al. |
| 2017/0309187 A1 | 10/2017 | Lin |
| 2017/0323244 A1 | 11/2017 | Rani et al. |
| 2017/0329348 A1 | 11/2017 | Li et al. |

(56) References Cited

U.S. PATENT DOCUMENTS

| | | |
|---|---|---|
| 2017/0344023 A1 | 11/2017 | Laubinger et al. |
| 2017/0349058 A1 | 12/2017 | Bernier et al. |
| 2017/0349176 A1 | 12/2017 | Alden et al. |
| 2017/0361762 A1 | 12/2017 | Wunsche, III et al. |
| 2018/0006365 A1 | 1/2018 | Powell |
| 2018/0018605 A1 | 1/2018 | Light-Holets et al. |
| 2018/0032072 A1 | 2/2018 | Hoye |
| 2018/0047293 A1 | 2/2018 | Dudar |
| 2018/0050697 A1 | 2/2018 | Kuszmaul et al. |
| 2018/0082590 A1 | 3/2018 | MacNeille et al. |
| 2018/0082591 A1 | 3/2018 | Pandy |
| 2018/0084511 A1 | 3/2018 | Wu et al. |
| 2018/0111611 A1 | 4/2018 | MacNeille et al. |
| 2018/0120861 A1 | 5/2018 | Saxena et al. |
| 2018/0137763 A1 | 5/2018 | Deragarden et al. |
| 2018/0188725 A1 | 7/2018 | Cremona et al. |
| 2018/0188745 A1 | 7/2018 | Pilkington |
| 2018/0188746 A1 | 7/2018 | Lesher et al. |
| 2018/0190119 A1 | 7/2018 | Miller, Jr. et al. |
| 2018/0190128 A1 | 7/2018 | Saigusa |
| 2018/0210461 A1 | 7/2018 | Cremona et al. |

FOREIGN PATENT DOCUMENTS

| | | |
|---|---|---|
| EP | 0 982 173 | 3/2000 |
| EP | 0 991 046 | 3/2005 |
| EP | 1 975 901 | 3/2009 |
| EP | 2 390 744 | 11/2011 |
| GB | 2540039 | 1/1917 |
| GB | 2551248 | 12/1917 |
| GB | 2557001 | 6/1918 |
| GB | 2557434 | 6/1918 |
| GB | 2558051 | 7/1918 |
| JP | 2017-215681 | 12/1917 |
| JP | 05-170008 | 7/1993 |
| JP | 2995970 | 12/1999 |
| JP | 2010-030525 | 2/2010 |
| JP | 5141849 | 2/2013 |
| WO | WO 2016/087555 | 6/1916 |
| WO | WO 2016/182489 | 11/1916 |
| WO | WO 2017/048165 | 3/1917 |
| WO | WO 2017/148113 | 9/1917 |
| WO | WO 2017/164792 | 9/1917 |
| WO | WO 2017/179193 | 10/1917 |
| WO | WO 2017/184062 | 10/1917 |
| WO | WO 2017/184063 | 10/1917 |
| WO | WO 2017/196165 | 11/1917 |
| WO | WO 2017/200433 | 11/1917 |
| WO | WO 2017/204712 | 11/1917 |
| WO | WO 2017/209124 | 12/1917 |
| WO | WO 2017/209666 | 12/1917 |
| WO | WO 2018/000386 | 1/1918 |
| WO | WO 2018/035145 | 2/1918 |
| WO | WO 2018/043519 | 3/1918 |
| WO | WO 2018/043520 | 3/1918 |
| WO | WO 2018/043753 | 3/1918 |
| WO | WO 2018/054520 | 3/1918 |
| WO | WO 2018/106774 | 6/1918 |
| WO | WO 2018/111177 | 6/1918 |
| WO | WO 2018/135630 | 7/1918 |
| WO | WO 2018/137754 | 8/1918 |
| WO | WO 2004/077378 | 9/2004 |
| WO | WO 2009/024563 | 2/2009 |
| WO | WO 2009/043643 | 4/2009 |
| WO | WO 2011/125193 | 10/2011 |
| WO | WO 2013/006826 | 1/2013 |
| WO | WO 2013/165297 | 4/2013 |
| WO | WO 2013/147682 | 10/2013 |
| WO | WO 2013/187835 | 12/2013 |
| WO | WO 2014/062118 | 4/2014 |
| WO | WO 2014/092628 | 6/2014 |
| WO | WO 2014/133425 | 9/2014 |
| WO | WO 2014/137270 | 9/2014 |
| WO | WO 2014/137271 | 9/2014 |
| WO | WO 2014/145918 | 9/2014 |
| WO | WO 2015/047174 | 4/2015 |
| WO | WO 2015/047175 | 4/2015 |
| WO | WO 2015/047176 | 4/2015 |
| WO | WO 2015/047177 | 4/2015 |
| WO | WO 2015/047178 | 4/2015 |
| WO | WO 2015/047179 | 4/2015 |
| WO | WO 2015/047181 | 4/2015 |
| WO | WO 2015/047182 | 4/2015 |
| WO | WO 2015/156731 | 10/2015 |
| WO | WO 2016/065055 | 4/2016 |
| WO | WO 2016/087901 | 6/2016 |
| WO | WO 2016/134610 | 9/2016 |
| WO | WO 2016/134770 | 9/2016 |
| WO | WO 2016/135207 | 9/2016 |
| WO | WO 2017/070714 | 4/2017 |

OTHER PUBLICATIONS

Switkes et al., International Application No. PCT/US17/47771, filed on Aug. 21, 2017.

Browand et al., "Fuel Saving Achieved in the Field Test of Two Tandem Trucks", California PATH Research Report, UCB-ITS-PRR-2001-20, Jun. 2004.

Shladover et al., "Demonstration of Automated Heavy-Duty Vehicles", California PATH Research Report, UCB-ITS-PRR-2005-23, Jun. 2005.

Shladover et al., "Development and Evaluation of Selected Mobility Applications for VII (a.k.a. IntelliDrive)", http://slideplayer.com/slide/6981587/, Jul. 1, 2009.

Tsugawa, "An Overview on an Automated Truck Platoon Within the Energy ITS Project", 7$^{th}$ IFAC Symposium on Advances in Automotive Control, Tokyo, Japan, Sep. 4-7, 2013.

Sugimachi et al., "Development of Autonomous Platooning System for Heavy-Duty Trucks", 7$^{th}$ IFAC Symposium on Advances in Automotive Control, Tokyo, Japan, Sep. 4-7, 2013.

Sheikholeslam et al., "Longitudinal Control of a Platoon of Vehicles; III; Nonlinear Model", Program on Advanced Technology for the Highway, Institute of Transportation Studies, University of California at Berkeley, Apr. 1, 1990.

Sheikholeslam et al., "Longitudinal Control of a Platoon of Vehicles", Department of Electrical Engineering and Computer Science, University of California, Berkeley, May 1990.

Sheikholeslam et al., "A System Level Study of the Longitudinal Control of a Platoon of Vehicles", Department of Electrical Engineering and Computer Science, University of California, Berkeley, Jun. 1992.

Porche et al., "Real Time Task Manager for Communications and Control in Multicar Platoons", Department of Electrical Engineering and Computer Science, University of California, Berkeley, Jun. 1992.

Gerdes et al., "Brake System Requirements for Platooning on an Automated Highway", Department of Mechanical Engineering, University of California, Berkeley, Jun. 1995.

Zabat et al., "The Aerodynamic Performance of Platoons: Final Report", California PATH Research Report, California PATH Program, Institute of Transportation Studies, University of California, Berkeley, Oct. 1995.

Gerdes et al., "Vehicle Speed and Spacing Control via Coordinated Throttle and Brake Actuation", Department of Mechanical Engineering, University of California, Berkeley, Sep. 1997.

Alvarez et al., "Safe Platooning in Automated Highway Systems Part I: Safety Regions Design", Department of Mechanical Engineering, University of California, Berkeley, 1999.

Alvarez et al., "Safe Platooning in Automated Highway Systems Part II: Velocity Tracking Controller", Department of Mechanical Engineering, University of California, Berkeley, 1999.

Michaelian et al., "Field Experiments Demonstrate Fuel Savings for Close-Following", University of Southern California, California PATH Research Report, Sep. 2000.

Simon Halle, "Automated Highway Systems: Platoons of Vehicles Viewed as a Multiagent System", University of Quebec, Jun. 2005.

(56) References Cited

OTHER PUBLICATIONS

Friedrichs et al., "A Generic Software Architecture for a Driver Information System to Organize and Operate Truck Platoons", https://www.researchgate.net/publication/256195846, May 2008.
Meisen et al., "A Data-Mining Technique for the Planning and Organization of Truck Platoons", https://www.researchgate.net/publication/256195756, May 2008.
Ramakers et al., "Electronically Coupled Truck platoons on German Highways",IEEE International Conference on Systems, Man, and Cybernetics, San Antonio, TX, Oct. 2009.
Kunze et al., "Organization and Operation of Electronically Coupled Truck Platoons on German Highways", RWTH Aachen University, Center for Learning and Knowledge Management and Department of Information Management in Mechanical Engineering, Aachen, Germany, Dec. 2009.
Kunze et al., "Efficient Organization of Truck Platoons by Means of Data Mining", $7^{th}$ International Conference on Informatics in Control, Automation and Robotics, RWTH Aachen University, Center for Learning and Knowledge Management and Department of Information Management in Mechanical Engineering, Aachen, Germany, Jan. 2010.
Jacobson et al., "Functional Safety in Systems of Road Vehicles", SP Technical Research Institute of Sweden, Jul. 2010.
Nowakowski et al., "Cooperative Adaptive Cruise Control: Testing Driver's Choices of Following Distances", California PATH Program, Institute of Transportation Studies, University of California, Berkeley, Jan. 2011.
Tsugawa et al., "An Automated Truck Platoon for Energy Saving", IEEE/RSJ International Conference on Intelligent Robots and Systems, San Francisco, CA, Sep. 25-30, 2011.
Desjardins et al., "Cooperative Adaptive Cruise Control: A Reinforcement Learning Approach", IEEE Transactions on Intelligent Transportation Systems, vol. 12, No. 4, Dec. 2011.
Larson et al., "Coordinated Route Optimization for Heavy-duty Vehicle Platoons", Proceedings of the $16^{th}$ International IEEE Annual Conference on Intelligent Transportation Systems (ITSC 2013), The Hague, The Netherlands, Oct. 6-9, 2013.
Aoki, "Research and Development of Fully Automated Vehicles", ITS Research Division, Japan Automobile Research Institute, Tokyo, Japan, Nov. 2013.
Lu et al., "Automated Truck Platoon Control and Field Test, Road Vehicle Automation", https://www.researchgate.net/publication/266390502, Aug. 2014.
White Paper, "Automated Driving and Platooning Issues and Opportunities", ATA Technology and Maintenance Council Future Truck Program, Sep. 21, 2015.
Nowakowski et al., "Cooperative Adaptive Cruise Control (CACC) for Truck Platooning: Operational Concept Alternatives", California PATH, California Partners for Advanced Transportation Technology, UC Berkeley, Mar. 2015.
Erlien, "Shared Vehicle Control Using Safe Driving Envelopes for Obstacle Avoidance and Stability", A Dissertation submitted to the Department of Mechanical Engineering and the Committee on Graduate Studies of Stanford University, Mar. 2015.
Shladover et al., "Cooperative Adaptive Cruise Control, Definitions and Operating Concepts", Transportation Research Record 2489, 2015.
Tsugawa et al., "A Review of Truck Platooning Projects for Energy Savings", IEEE Transactions on Intelligent Vehicles, vol. 1, No. 1, Mar. 2016.
Geiger et al., "Team AnnieWAY's Entry to the 2011 Grand Cooperative Driving Challenge", IEEE Transactions on Intelligent Transportation Systems, vol. 13, No. 3, Sep. 2012.

Bergenheim et al., "Vehicle-to-Vehicle Communication for a Platooning System", SP Technical Research Institute of Sweden, Procedia—Social and Behavioral Sciences vol. 48, 2012.
Bae et al., "Road Grade and Vehicle Parameter Estimation for Longitudinal Control Using GPS", 2001 IEEE Intelligent Transportation Systems Conference Proceedings, Oakland, CA, Aug. 25-29, 2001.
Holm, "Vehicle Mass and Road Grade Estimation Using Kalman Filter", MSc Thesis, Department of Electrical Engineering, Sweden, Aug. 2011.
Kidambi et al., "Methods in Vehicle Mass and Road Grade Estimation", SAE International, University of Michigan, Apr. 1, 2014.
Paulsson et al., "Vehicle Mass and Road Grade Estimation Using Recursive Least Squares", MSc Thesis, Lund University, 2016.
Montvey, et al., Priority Document associated with EP Application No. 03100457.5., Feb. 25, 2003.
International Search Report and Written Opinion dated Oct. 27, 2017 from International Application No. PCT/US2017/046866.
Alam et al., "An Experimental Study on the Fuel Reduction Potential of Heavy Duty Vehicle Platooning", 2010 $13^{th}$ International IEEE, Annual Conference on Intelligent Transportation Systems, Sep. 19-22, 2010.
"Automated Highway System: Milestone 2 Report, Task C2: Downselect System Configurations and Workshop #3" (National Automated Highway System Consortium, Troy, MI, Jun. 1997), 604 pages.
Wille, Matthias et al., "KONVOI: Electronically coupled truck convoys", in Human Factors for Assistance and Automation, D. de Waard et al. (Eds.) (Shaker Publishing, Maastricht, the Netherlands, Jan. 2008), pp. 243-256.
Shladover, Steven E. et al. "Development and Evaluation of Selected Mobility Applications for VII: Concept of Operations", California PATH Working Paper UCB-ITS-PWP-2009-3 (U.C. Berkeley, Berkeley, CA, Mar. 2009), 14 pages.
Shladover, Steven E. et al., "Development and Evaluation of Selected Mobility Applications for VII", California PATH Research Report UCB-ITS-PRR-2011-09, (U.C. Berkeley, Jun. 2011), 109 pages.
Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.
Roeth, Michael, "CR England Peloton Technology Platooning Test Nov. 2013", (North American Council on Freight Efficiency (NACFE.org), Fort Wayne, IN, Dec. 2013);Retrieved Aug. 23, 2018 at https://nacfe.org/wp-content/uploads/2018/02/Peloton-NACFE-Fuel-Test-Report-120213.pdf.
Bevly, David et al. "Heavy Truck Cooperative Adaptive Cruise Control: Evaluation, Testing, and Stakeholder Engagement for Near Term Deployment: Phase One Final Report", Report to Federal Highway Administration (Auburn University, Auburn, AL, Apr. 2015), 135 pages; Retrieved Aug. 23, 2018 at http://atri-online.org/wp-content/uploads/2015/05/DATPPhase1FinalReport.pdf.
Nowakowski, Christopher et al., "Heavy vehicle automation: Human factors lessons learned", Procedia Manufacturing vol. 3, Jul. 2015, pp. 2945-2952.
Zhao, Siyang et al., "Vehicle to Vehicle Communication and Platooning for EV with Wireless Sensor Network", SICE Annual Conference 2015, Hangzhou, China, Jul. 2015, pp. 1435-1440.
Brizzolara, Davide & Toth, Andrea, "The Emergence of Truck Platooning", Baltic Transport Journal, Mar. 2016, pp. 58-59.
Bergenheim et al., "Overview of Platooning Systems", http://publications.lib.chalmers.se/records/fulltext/174621.pdf, 2012.

* cited by examiner

DYNAMIC GAP CONTROL FOR AUTOMATED DRIVING

CROSS-REFERENCE TO RELATED APPLICATIONS

The present application claims priority of U.S. Provisional Patent Application Nos. 62/489,662 filed on Apr. 25, 2017 and 62/377,970, filed on Aug. 22, 2016, each of which is incorporated herein by reference in its entirety.

BACKGROUND

The present invention relates generally to systems and methods for enabling vehicles to closely follow one another safely using automatic or partially automatic control. More particularly, the invention relates to systems and methods for maintaining a desired gap between vehicles.

In recent years significant strides have been made in the field of automated vehicle control. One segment of vehicle automation relates to vehicular convoying systems that enable vehicles to follow closely together in a safe, efficient and convenient manner. Following closely behind another vehicle has the potential for significant fuel savings benefits, but is generally unsafe when done manually by the driver. One type of vehicle convoying system is sometimes referred to as vehicle platooning in which a second, and potentially additional, vehicle(s) is/are automatically or semi-automatically controlled to closely follow a lead vehicle in a safe manner.

The fuel efficiency advantages of platooning are particularly noticeable in fields such as the trucking industry in which long distances tend to be traveled at highway speeds. One of the on-going challenges of vehicle platooning and convoying systems is controlling the gap between the platooning vehicles. The potential fuel economy gains generally improve the closer the platooning vehicle travel together. At the same time, the reaction time potentially available for responding to changes initiated by the lead vehicle is shortened as the gap shortens which can make the gap control more challenging. At times, braking may be required to prevent a trailing vehicle from getting too close to a leading vehicle. Frequent braking and/or the frequent use of other fuel inefficient gap control techniques can quickly erode the potential fuel efficiency advantages of platooning and convoying systems.

Although existing gap control techniques work well, there are continuing efforts to develop improved gap control methods and systems that provide safe and fuel efficient operation as well as a comfortable user experience. The present application describes techniques for controlling the gap between vehicles that are well suited for platooning, convoying and other automated or semi-automated driving applications.

SUMMARY

A variety of methods, controllers and algorithms are described for controlling a vehicle to closely follow one another safely using automatic or partially automatic control. The described control schemes are well suited for use in vehicle platooning and/or vehicle convoying applications, including truck platooning and convoying controllers.

In one aspect, a power plant (such as an engine) is controlled using a control scheme arranged to attain and maintain a first target gap between the vehicles. Brakes (such as wheel brakes) are controlled in a manner configured to attain and maintain a second (shorter) target gap. Such control allows a certain degree of encroachment on the targeted gap (sometimes referred to as a gap tolerance) before the brakes are actuated. The described approaches facilitate a safe and comfortable rider experience and reduces the likelihood of the brakes being actuated unnecessarily—which can improve fuel economy. It also has the potential to reduce braking system maintenance costs—particularly in the context of platooning or convoying trucks where the unnecessary use of foundation brakes can lead to more frequent costly brake repairs/replacement.

In some embodiments, if it is determined that the lead vehicle is braking (or is imminently going to brake), the brake control is switched to a control scheme that has the same gap target as the engine control in some circumstances and/or to a control scheme that has an intermediately target between the first and second target gaps—as for example a target configured to maintain the current gap encroachment when a portion of the gap tolerance is already encroached when the front vehicle braking is identified.

In some embodiments a platoon controller that includes separate engine output (e.g. torque) request and braking request controllers is provided to implement the described control. In such an arrangement the torque and braking request controllers can readily be configured to control towards different gap targets. The respective gap targets can be independent adjusted on the fly to provide the control characteristics appropriate for the current operating conditions.

In some embodiments, the engine output and braking request controllers take the form of sliding mode controllers.

In applications where the host vehicle includes a retarder (as will often be the case in heavy truck control applications), retardation and/or other types of engine braking may be invoked as part of the engine torque control, with the wheel brakes being responsive to the brake request controller but not the torque request controller.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some case, one or more alternatives. It will be apparent to those skilled in the art that the invention can be practice without implementing all of the features disclosed herein.

The Applicant has proposed various vehicle platooning systems in which a second, and potentially additional, vehicle(s) is/are automatically, or semi-automatically controlled to closely follow a lead vehicle in a safe manner. By way of example, U.S. application Ser. Nos. 13/542,622 and 13/542,627; U.S. Provisional Application Nos. 62/377,970 and 62/343,819; and PCT Application Nos. PCT/US2014/030770, PCT/US2016/049143 and PCT/US2016/060167 describe various vehicle platooning systems in which a trailing vehicle is at least partially automatically controlled to closely follow a designated lead vehicle. Each of these earlier applications is incorporated herein by reference.

One of the goals of platooning is typically to maintain a desired longitudinal distance between the platooning vehicles, which is frequently referred to herein as the "desired gap". That is, it is desirable for the trailing vehicle (e.g., a trailing truck) to maintain a designated gap relative to a specific vehicle (e.g., a lead truck). The vehicles involved in a platoon will typically have sophisticated control systems suitable for initiating a platoon, maintaining the gap under a wide variety of different driving conditions, and gracefully dissolving the platoon as appropriate.

Figure 1:
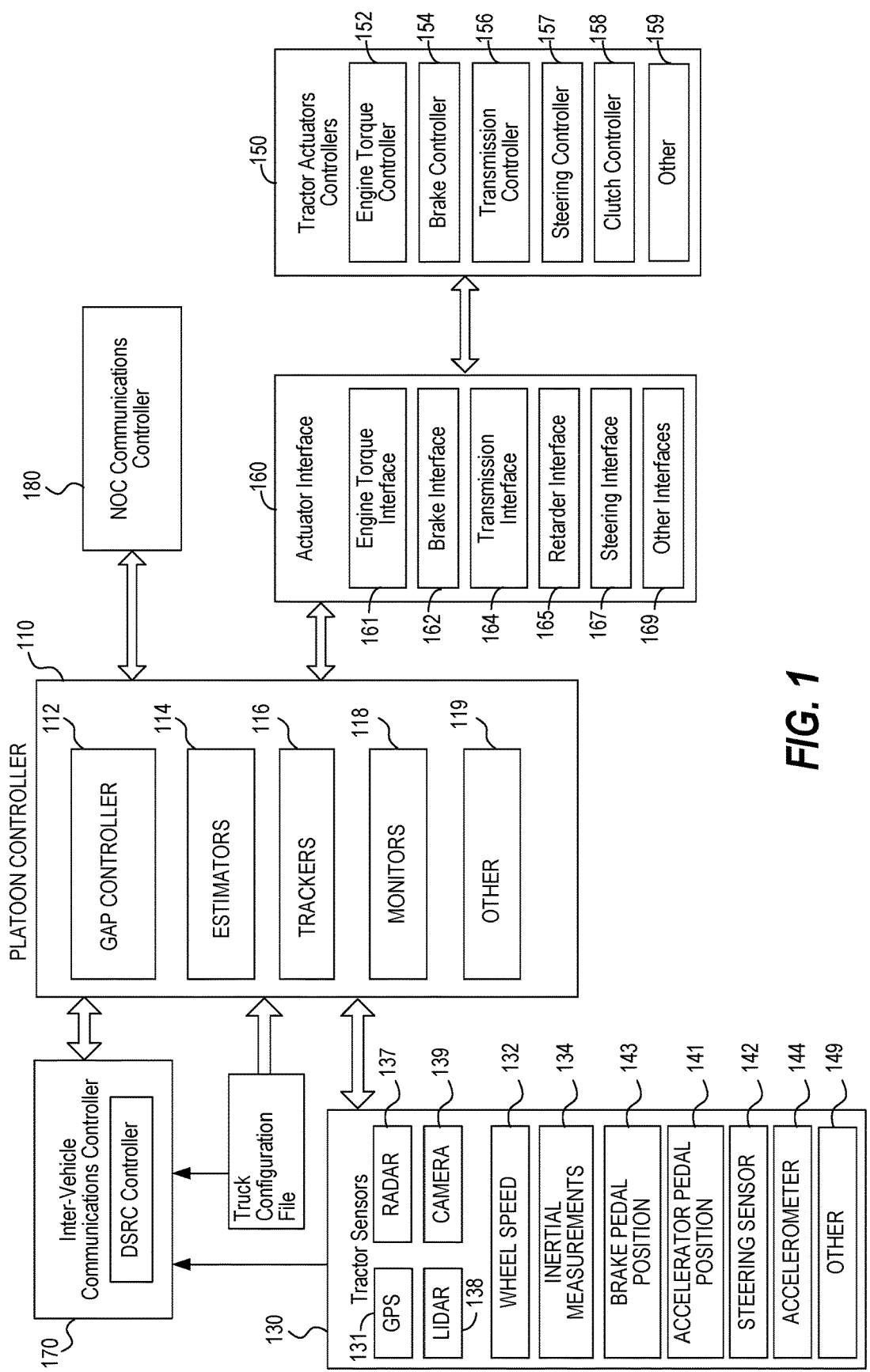
FIG. 1 is a block diagram of a controller architecture suitable for use in an automated or partially automated vehicle control system that supports platooning.

The architecture and design of control systems suitable for implementing vehicle platooning may vary widely. The specific controller design can vary based on the level of automation contemplated as part of the platoon, as well as the nature of and equipment available on the host vehicles participating in the platoon. By way of example, FIG. 1 diagrammatically illustrates a vehicle control architecture that is suitable for use with platooning tractor-trailer trucks. The specific controller illustrated is primarily designed for use in conjunction with a platooning system in which both vehicles include an active driver. The driver of the lead vehicle being fully responsible for control of the front vehicle. The a driver of the trailing vehicle is responsible for steering the trailing vehicle, but the platoon controller 110 is primarily responsible for controlling the trailing vehicle's torque and braking requests during active platooning. However it should be appreciated that generally similar control schemes can be used in systems which contemplate more automated control of one or both of the platoon partners.

In the illustrated embodiment illustrated in FIG. 1, a platoon controller 110, receives inputs from a number of sensors 130 on the tractor and/or one or more trailers or other connected units, and a number of actuators and actuator controllers 150 arranged to control operation of the tractor's powertrain and other vehicle systems. An actuator interface 160 may be provided to facilitate communications between the platoon controller 110 and the actuator controllers 150. The platoon controller 110 also interacts with an inter-vehicle communications controller 170 which orchestrates communications with the platoon partner and a NOC communications controller 180 that orchestrates communications with a network operations center (NOC). The vehicle also preferably has selected configuration files 190 that include known information about the vehicle.

Some of the functional components of the platoon controller 110 include gap controller 112, a variety of estimators 114, one or more partner vehicle trackers 116 and various monitors 118. In many applications, the platoon controller 110 will include a variety of other components 119 as well. Exemplary embodiments of the platoon controller 110 and gap controller 112 are described in more detail below with reference to FIGS. 2 and 3.

Some of the sensors utilized by the platoon controller 110 may include GNSS (GPS) unit 131, wheel speed sensors 132, inertial measurement devices 134, radar unit 137, LIDAR unit 138, cameras 139, accelerator pedal position sensor 141, steering wheel position sensor 142, brake pedal position sensor 143, and various accelerometer 144. Of course, not all of these sensors will be available on all vehicles involved in a platoon and not all of these sensors are required in any particular embodiment. A variety of other sensor 149 (now existing or later developed or commercially deployed) may be additionally or alternatively be utilized by the platoon controller in other embodiments. In the primary embodiments described herein, GPS position data is used. However, GPS is just one of the currently available global navigation satellite systems (GNSS). Therefore, it should be appreciated that data from any other GNSS system or from other suitable position sensing systems may be used in place of, or in addition to the GPS system.

Many (but not all) of the described sensors, including wheel speed sensors, 132, radar unit 137, accelerator pedal position sensor 141, steering wheel position sensor 142, brake pedal position sensor 143, and accelerometer 144 are relatively standard equipment on newer trucks (tractors) used to pull semi-trailers. However, others, such as the GNSS unit 131 and LIDAR unit 138 (if used) are not currently standard equipment on such tractors or may not be present on a particular vehicle and may be installed as needed or desired to help support platooning.

Some of the vehicle actuators controllers 150 that the platoon controller may direct at least in part include engine torque controller 152 (which is often part of the integrated functionality of an engine control unit (ECU) or power train control module (PCM)); transmission controller 154; brake controller 156; steering controller 157 (when automated steering is provided); and clutch controller 158. Of course, not all of these actuator controllers will be available or are required in any particular embodiment and it may be desirable to interface with a variety of other vehicle actuator controllers 159 that may be available on the controlled vehicle as well. Therefore, it should be appreciated that the specific actuator controllers 150 directed or otherwise utilized by the platoon controller on any particular controlled vehicle may vary widely. Further, the capabilities of any particular actuator controller (e.g. engine torque controller 152), as well as its interface (e.g., the nature and format of the commands, instructions, requests and messages it can handle or generate) will often vary with the make and model of that particular actuator controller. Therefore, an actuator interface 160 is preferably provided to translate requests, commands, messages and instructions from the platoon controller 110 into formats that are appropriate for the specific actuator controller hardware and software utilized on the controlled vehicle. The actuator interface 160 also provides a mechanism for communicating/translating messages, commands, instructions and requests received from the various actuator controllers back to the platoon controller 110. Typically an appropriate actuator interface would be provided to interact with each of the specific vehicle controllers utilized. In various embodiments, this may include one or more of: an engine torque interface 161; a brake interface 162; a transmission interface 164; a retarder interface 165 (if a separate retarder controller is used); a steering interface 167; and/or any other appropriate controller interface 169.

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder will be controlled by the engine torque controller 152 and in such embodiments, the retarder can be controlled by sending appropriate torque commands (which may be negative) to the engine torque controller 152. In other embodiments a separate retarder controller (not shown) may be accessible to, and therefore directed by, platoon controller 110 through an appropriate retarder interface 165.

The communications between vehicles may be directed over any suitable channel and may be coordinated by inter-vehicle communications controller 170. By way of example, the Dedicated Short Range Communications (DSRC) protocol, which is a two-way short to medium range wireless communications technology that has been developed for vehicle to vehicle communications, works well. The specific information transmitted back and forth between the vehicles may vary widely based on the needs of the platoon controller.

The communications between vehicles may be directed over any suitable channel and may be coordinated by inter-vehicle communications controller 170. By way of example, the Dedicated Short Range Communications (DSRC) protocol (e.g. the IEEE 802.11p protocol), which is a two-way short to medium range wireless communications technology that has been developed for vehicle to vehicle communications, works well. Of course other communications protocols and channels may be used in addition to or in place of a DSRC link. For example, the inter vehicle communications may additionally or alternatively be transmitted over a Citizen's Band (CB) Radio channel, one or more General Mobile Radio Service (GMRS) bands, and one or more Family Radio Service (FRS) bands or any other now existing or later developed communications channels using any suitable communication protocol.

In various embodiments, the transmitted information may include the current commands generated by the platoon controller 110 such as requested/commanded engine torque 280, requested/commanded braking deceleration 282. They may also include steering commands, gear commands, etc. when those aspects are controlled by platoon controller 110. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 110 is also transmitted to the platoon partner and corresponding information is received from the platoon partner so that the platoon controllers 110 on each vehicle can develop an accurate model of what the partner vehicle is doing. The same is true for any other relevant information that is provided to the platoon controller, including any vehicle configuration information 190 that is relevant to the platoon controller. It should be appreciated that the specific information transmitted may vary widely based on the requirements of the platoon controllers 110, the sensors and actuators available on the respective vehicles, and the specific knowledge that each vehicle may have about itself.

The information transmitted between vehicles may also include information about intended future actions. For example, if the lead vehicle knows it approaching a hill, it may expect to increase its torque request (or decrease its torque request in the context of a downhill) in the near future and that information can be conveyed to a trailing vehicle for use as appropriate by the platoon controller 110. Of course, there is a wide variety of other information that can be used to foresee future torque or braking requests and that information can be conveyed in a variety of different forms. In some embodiments, the nature of the expected events themselves can be indicated (e.g., a hill, or curve or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as the cellular network, various Wi-Fi networks, satellite communications networks and/or any of a variety of other networks as appropriate. The communications with the NOC may be coordinated by NOC communications controller 180. The information transmitted to and/or received from the NOC may vary widely based on the overall system design. In some circumstances, the NOC may provide specific control parameters such as a target gap tolerance. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to the platoon controller. The NOC may also provide information about the partner vehicle including its configuration information and any known relevant information about its current operational state such as weight, trailer length, etc.

The configuration file 190 may include a wide variety of information about the host vehicle that may be considered relevant to the controller. By way of example, some of the information might include the vehicle's specification including such things as engine performance characteristics, available sensors, the nature of its braking system, the location of its GNSS antenna relative to the front of the cab, gear ratios, differential ratios etc.

Figure 2:
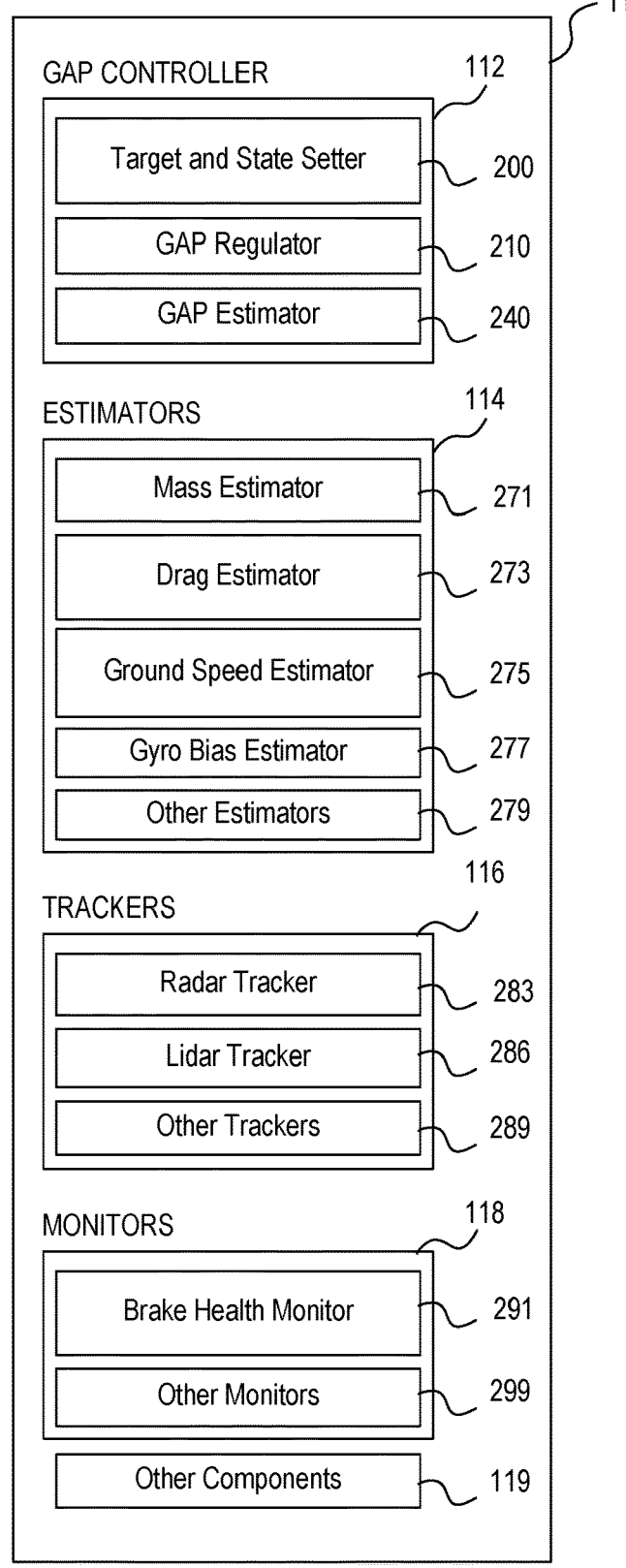
FIG. 2 is a block diagram of a representative platoon controller architecture suitable for use in the automated or partially automated vehicle control system of FIG. 1.

FIG. 2 illustrated a particular embodiment of a platoon controller 110. In the illustrated embodiment, the platoon controller 110 includes a gap controller 112, a plurality of estimators 114, one or more trackers 116, any desired monitors 118 and potentially any of a variety of other components 119.

In the illustrated embodiment, the gap controller 112 includes a target and state setter 200, a gap regulator 210 and a gap estimator 240. In general, the target and state setter 200 is arranged to determine the intended operational mode (state) of the gap regulator 210 and the values of any variable control parameters that are appropriate for use in that operational mode.

The gap regulator 210 is arranged to control the trailing platoon partner in the manner designated by the target and state setter 200. In the gap control operational mode, the gap regulator 210 controls the vehicle in a manner that seeks to attain and maintain the desired gap in accordance with any designated control parameters specified by the state setter 200. In other modes, the gap regulator 210 controls the vehicle in a manner that seeks to attain the appropriate response for the selected operational mode.

The gap estimator 240 is arranged to estimate/determine the current gap based on actual measurements and/or other information that is available to the platoon controller 110. It should be apparent that an accurate understanding of the current gap is important to successful operation of the gap regulator. At the same time, it should be appreciated that any measurement system has inherent tolerances and can be subject to reporting errors and/or may become unavailable in some circumstances. Thus, the gap estimator 240 is configured to receive information from multiple position or relative position related sensors and to fuse such data into a reliable estimate of the current gap.

The torque and braking requests generated by GAP regulator 210 are sent to the appropriate actuator interface (e.g., engine torque interface 161 and brake interface 162 respectively). The engine torque interface 161 then forwards an appropriate torque command to engine torque controller 152 which directs the delivery of the requested torque by directing various engine operating parameters such as fuel charge, valve timing, retarder state, etc. appropriately. The brake interface 162 generates an appropriate brake request that is sent to the brake controller 156.

A particular embodiment of gap controller 112 is described in more detail below with reference to FIG. 3.

Returning to FIG. 2, there are a variety of estimators 114 that are useful for the gap controller 112. In various embodiments these may include one or more of a mass estimator 271, a drag estimator 273, a ground speed estimator 275, a gyro bias estimator 277 and/or other estimators 279.

The mass estimator 271 is arranged to estimate the respective masses of the platoon partners. These mass estimations may be used by the gap controller 112 to help scale its torque and brake requests appropriately based on the respective weights (masses) of the platoon partners.

The drag estimator 273 is arranged to estimate the respective drag resistances of the platoon partners. These drag resistance estimates may also be used by the gap controller to help adjust its torque and brake requests appropriately. In general, the drag resistance of any particular truck or other vehicle can vary based on a variety of factors including: (a) its drag profile (which in the context of a truck may change based on the trailer being pulled—if any, or other characteristics of the load); (b) the vehicle's current speed, (c) wind speed and direction, (d) rolling resistance, (e) platoon state (e.g., whether a platoon is active, the position of the vehicle within the platoon, the gap), (f) bearing wear, etc.

The ground speed estimator 275 is arranged to estimate the actual ground speed of the respective platoon partners. Many trucks and other vehicles have wheel speed sensors that can quite accurately measure the rotational speed of the associated wheels. The actual ground speed at which the vehicles are traveling will vary based on the respective diameters of the wheels and slip conditions of the tires. The precise diameter of the wheels can vary based on the tires used. Furthermore, the diameter of the wheels will vary over time with tire wear, changes in ambient temperature and other factors. The wheel diameter will even change over the course of a particular trip as the tires heat up (or otherwise change in temperature) during use. In practice, all of these variations in wheel diameter are potentially significant enough to impact the gap estimation and gap control. Therefore, the ground speed estimator 275 is arranged to estimate the actual ground speed based on measured wheel speed and other available information such as GNSS information. The ground speed estimates are particularly useful in times when tracker based gap measurements (e.g., radar, cameras, LIDAR, etc.) aren't available—which may occur, for example, when the platoon partners are laterally offset due to a lane change, etc.

Several of the measurements utilized by the gap controller 112 are inertial measurements that are gyro based. These may include yaw measurements which indicate the rate at which the associated vehicle is turning, longitudinal acceleration measurements, etc. Gyros often have an inherent measurement error referred to as a gyro bias that can affect measurements. The gyro bias estimator 277 estimates such biases to allow the gap controller to compensate for such gyro based measurement errors.

The platoon controller 110 can include any other estimators 279 that may be useful to any particular gap controller 112 as well.

The platoon controller 110 may also include one or more trackers 116. Each tracker 116 is arranged to measure or otherwise determine the gap. One type of tracker that is used in many implementations is a radar based tracker 283. Newer commercially available trucks often come equipped with a radar unit as standard equipment and radar trackers are particularly well suited for use in such vehicles. Of course, one or more radar units may be installed on any vehicle that does not come pre-equipped with a radar unit to facilitate use of radar tracker 283. By way of example, some specific radar trackers are described in more detail in co-pending U.S. application Ser. Nos. 15/590,715 and 15/590,803, both filed May 9, 2017, both of which are incorporated herein by reference.

LIDAR is another distance measuring technology that is well suited for measuring the gap between vehicles. LIDAR is quickly gaining popularity for use in automated and autonomous driving applications. LIDAR tracker 286 is well suited for use on vehicles that have or are provided with LIDAR units. Cameras and stereo cameras are also becoming more popular distance measuring tools for use in various automated and autonomous driving applications.

Of course, other distance measuring technologies can be used to measure or estimate the gap between vehicles as represented by other trackers 289. By way of example, a GPS tracker could be used that is based primarily on the respective reported GPS positions of the vehicles.

The tracker(s) used in many embodiments are configured to fuse data from multiple sensors to help validate the measurements of the primary sensors used by the respective trackers. The aforementioned radar tracker application describes a variety of methods for fusing data to help validate measurements of a primary sensor in that manner.

In various embodiments, the gap estimator 240 could replace or be replaced by one or more of the trackers, or could be thought of as a tracker itself since it determines/estimates the gap based on inputs from multiple sensors. In the illustrated embodiment, the gap estimator 240 is shown separately as part of gap controller 112 since it fuses distance data from the tracker(s) and any other available sources such as GNSS sensors on each of the vehicles.

The platoon controller 110 may also include one or more monitors 118 that are configured to monitor specific components that are relevant to gap control. By way of example, one specific monitor that is particularly useful to the control of platooning trucks is brake health monitor 291. The brake health monitor 291 is configured to monitor the brake system and to identify circumstances in which the brakes may not be able to deliver the level of braking normally expected for platoon control—as for example could occur if the foundation brakes include drum brakes that have been used while traveling downhill in the mountains to the extent that they are close to overheating. If the brake health monitor 291 identifies such a circumstance, it informs the platoon controller, which can take the appropriate remedial action. The appropriate remedial action will vary based on the specific circumstances identified by the brake health monitor, but may include, for example, actions such as dissolving the platoon, increasing the target gap to a level more appropriate for the brake conditions, etc. Of course, the brake health monitor can also configured to identify circumstances in which the condition of the brakes has improved (e.g., the brakes have cooled sufficiently) and inform the platoon controller of those circumstances as well so that the platoon controller can act accordingly. For example, improved braking status may allow the target gap to be reduced, a platoon to be reestablished or other appropriate actions.

The platoon controller may include any of a variety of other monitors 299 that are configured to monitor the state or status of other components, systems, environmental conditions, road or traffic conditions, etc. that may be relevant to platoon control. For example, a DSRC link monitor may be provided to monitor the status of a DSRC communication link between the platoon partners.

Figure 3:
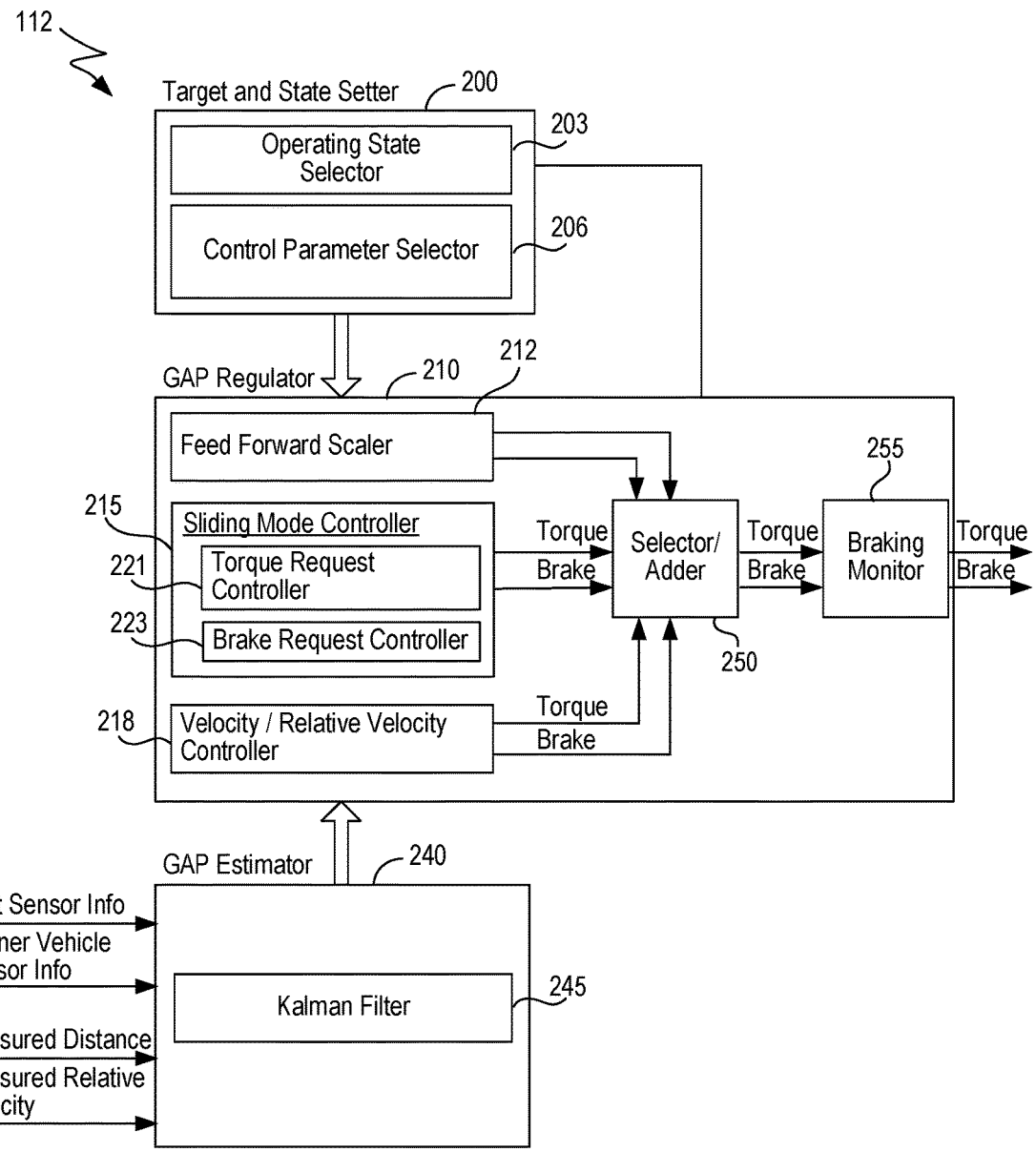
FIG. 3 is a block diagram of a gap controller in accordance with one embodiment.

Referring next to FIG. 3, another embodiment of gap controller 112 will be described in more detail. Similarly to the embodiment illustrated in FIG. 2, the gap controller 112 includes a target and state setter 200, a gap regulator 210 and a gap estimator 240. In the embodiment of FIG. 3, the target and state setter 200 includes an operating state selector 203, and a control parameter selector 206 that determines, selects, sets or otherwise indicates to the gap regulator the values of any variable control parameters that are appropriate for use in the selected operational mode.

The operating state selector 203 is arranged to determine the intended operational mode (state) of the gap regulator 210. In some specific embodiments, the operational modes might include a "normal" or "gap control" operational mode in which the gap regulator is configured to control towards attaining and maintaining a designated gap between the vehicles. In the gap control operational mode control parameter variables dictated by the control parameter selector might include the target gap itself (e.g. 10 m, 12 m, etc.)—which may vary somewhat based on driving conditions (e.g., weather, terrain, road conditions, traffic, etc.). Other control parameters during normal operation may include parameters that impact the draw-in speed, the tightness of the control, tolerances or variations between torque control and braking control, etc. In other embodiments, "initiate platoon" and/or "draw-in" or "pull-in" may be one or more separate states that are used to establish a platoon and/or to bring the platoon partners together in a safe manner under at least partially automated control.

Another potential operational mode is a "dissolve" mode in which the platoon controller transitions the trailing vehicle toward/to a position at which the driver of the trailing vehicle (or an automatic cruise control system) can safely take over control of the vehicle. Generally, dissolving a platoon includes increasing the gap between the vehicles in a controlled manner to/towards a point at which the platoon can be dissolved and vehicle control can be safely transferred to manual control by the driver or to control through the use of a different system such as adaptive cruise control. The dissolve mode may optionally be triggered by a wide variety of different circumstances, as for example, in response to one of the platoon partners or the NOC deciding to terminate the platoon; the detection of a car cutting-in between the platooning vehicles; the loss of communications between the vehicles for an extended period; the detection of an object in front of the lead vehicle that is too slow or too close to the platoon; etc.

Another potential operational mode may be a velocity control or relative velocity control mode. Velocity control, or relative velocity control may be preferable to trying to control to maintain a particular gap in a variety of specific circumstances—as for example when the trailing vehicle's radar (or other) tracking unit loses sight of the partner vehicle, as can occur when there is a lateral offset between the vehicles due to a lane change or other conditions.

Of course, there can be a variety of other operational modes as well.

The gap regulator 210 is arranged to control the trailing platoon partner in the manner designated by the target and state setter 200. In the embodiment illustrated in FIG. 3, the gap regulator 210 includes a scaler 212 and two separate controllers which are used in different combinations in different operating modes. In the illustrated embodiment, the controllers include a sliding mode controller 215 (which performs gap control) and a velocity/relative velocity controller 218. It should be appreciated that in other embodiments, a single controller, additional and/or different may be provided as appropriate for any particular implementation.

In the illustrated embodiment, the feed forward scaler 212 is configured to scale the torque and brake signals from the front vehicle before adding them to the outputs from the sliding mode and relative velocity controllers 215, 218 to create the torque and brake request to the engine and brake controllers. Such scaling may be based on factors such as the respective weights (masses) of the platoon partners, the respective drags of the vehicles, the severity of a braking event (e.g., in high braking scenarios, the braking command may be increased a bit to provide a margin of safety to account for uncertainties in braking performance and reactions times), etc. In other embodiments, such scaling functions can be integrated into the respective controllers themselves if desired.

The sliding mode controller 215 is configured to control the trailing vehicle in a manner that seeks to attain and maintain the desired gap in accordance with the target gap and any other control parameters specified by the control parameter selector 206. Thus, its primary function is gap control. The velocity controller 218 is configured to control the trailing vehicle in a manner that maintains a designated velocity relative to the lead vehicle, or in some circumstances, simply a designated velocity. In the illustrated embodiment, these two separate controllers are provided so that the gap regulator 210 can provide different types of control, as may be appropriate in different operational circumstances. A few specific examples are described with reference to FIGS. 4A-4C. In the described embodiments, both the controllers 215 and 218 are operated continuously during platooning and the selector/adder 250 is used to select the appropriate signals to output based on the current operating mode. An optional braking monitor 255 is a safety feature that may be utilized to help ensure that the brake commands outputted by selector/adder 250 don't overly aggressively brake the trailing vehicle except in where necessary from a safety/crash prevention standpoint. This is to reduce the risk of traffic behind the trailing platoon partner from being impacted by unexpected aggressive braking of the trailing platoon partner.

Figure 4A:
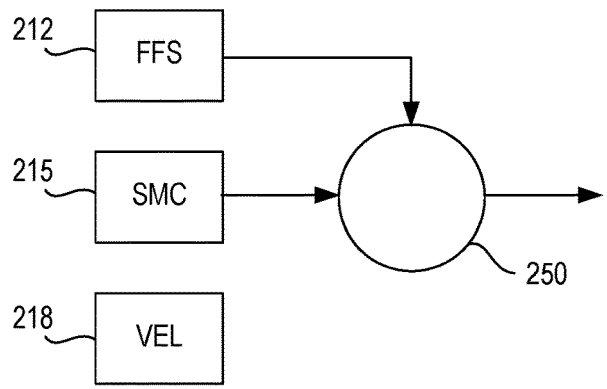
FIGS. 4A-4C are a series of diagrams illustrating different control states used by a gap regulator in accordance with one embodiment during different operational states.

Normal gap control is illustrated in FIG. 4A. During normal gap control, the sliding mode controller 215 is used to determine torque and brake requests that are appropriate to attain and maintain the target gap set by control parameter selector 206. When appropriate, the torque and brake requests generated by the sliding mode controller 215 may be scaled appropriately by selector/adder 250 based on inputs from feed forward scaler 212. In this normal gap control mode, the outputs of the relative velocity controller 218 are not used in the control of the trailing vehicle.

In some embodiments, the sliding mode controller 215 includes separate torque request and brake request controllers 221, 223 as illustrated in FIG. 3. The torque request and brake request controllers 221, 223 are configured to control the engine and brakes respectively towards different gap targets which tends to provide a smoother, more comfortable ride and reduce the use of wheel brakes (e.g., the foundation brakes in tractor-trailer rigs) compared to control in which the engine and brakes are controlled to the same target gap. Such a gap control architecture is described in more detail in U.S. Provisional application No. 62/489,662, which is incorporated herein by reference. In some implementations, the torque request and brake request controllers 221, 223 are configured as separate sliding mode controllers.

Although the sliding mode controller 215 works very well to control the gap, there will be operational circumstances in which different types of control may be appropriate. For example, a different type of control may be desirable when it is necessary to dissolve a platoon and return the trailing vehicle to manual or other automated control. Typically, the gap between vehicles during platooning will be smaller, often much smaller, than can safely be maintained by a driver under manual control. Therefore, in general, when a platoon is dissolved with the intent to restoring manual control of the trailing vehicle, it will be desirable to grow the gap to a distance that is appropriate for manual control before relinquishing control to the driver. This can be accomplished in a smooth manner by relative velocity controller 218.

Figure 4B:
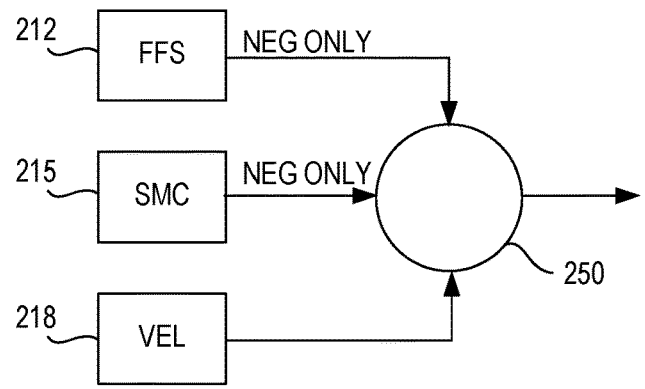

When operating state selector 203 determines that the platoon should be dissolved, it directs the GAP regulator 210 to transition to a dissolve mode as represented by FIG. 4B. In the dissolve mode, primary control is provided by relative velocity controller 218. The control parameter selector 206 may designate a desired (target) relative velocity for the trailing truck during the dissolve. The specific target relative velocity may vary based on the nature of the circumstances and/or the vehicles involved in the platoon. In general, it is desirable to select a relative velocity that will cause the vehicles to gradually, but expeditiously separate, without requiring the trailing vehicle to slow excessively (which could unduly hinder following traffic) and preferably without requiring the lead vehicle to alter its drive plan. By way of example, relative velocities during dissolves on the order of 0.5 to 4 meters per second, as for example, 1-2 m/s, have been found to work well in the context of platooning trucks.

During a dissolve, the lead vehicle may take a variety of actions. For example, the lead truck may accelerate or increase its torque command aggressively. In such cases, it may not be desirable to try to accelerate the trailing truck in a similar manner thereby allowing the lead vehicle to pull away more than would otherwise occur under relative velocity control. One way to accomplish this in the context of platooning trucks is to ignore or otherwise disable positive torque commands from feed forward scaler 212.

Another potential scenario is that the lead truck brakes or slows significantly while under velocity control. In some circumstances, the velocity controller 218 may be configured to permit a certain amount of gap shrinkage when the gap is relatively larger to thereby reduce the overall amount of braking required. In the illustrated embodiment, the sliding mode controller is configured to ensure that the gap between the vehicles is always sufficient to give the trailing vehicle sufficient time to respond in a manner that prevents the trailing vehicle from running into the back of the lead vehicle regardless of the occurrence of (reasonable) unexpected events. Therefore, if the sliding mode controller is outputting a braking or negative torque signal that has a greater magnitude than the relative velocity controller, then that larger braking/negative torque command should be passed to the vehicle's engine and braking controllers. Therefore, during a dissolve, the selector/adder 250 is configured to only utilize negative commands (i.e., braking commands and negative torque commands) from the sliding mode controller 215 and to only use such commands when they are greater in magnitude than the commands from the relative velocity controller 218.

There may also be operational circumstances outside of dissolves in which relative velocity control or simply velocity control is desired. For example, there may be circumstances in which the back of the lead vehicle moves out of view of the trailing vehicle's tracker(s) 116 or the tracker(s) 116 otherwise loses sight of the back of the platoon partner. This can occur, for example, as a result of a lane change by one of the platoon partners. In such a circumstance the gap regulator may not have an accurate measure of the longitudinal gap between the vehicles—and may have to rely on less accurate approaches for determining the gap such as the vehicle's respective GNSS positions. In such circumstances, it may be desirable to control the trailing vehicle to slowly drop back until the back of the lead vehicle comes within the tracker's view. Again, the relative velocity controller 218 is well suited for use in this circumstance—although the preferred relative velocity control may be a bit different than occurs during a dissolve. Specifically, the goal is typically not to drop back as quickly or as far as would occur during a dissolve—thus a smaller relative velocity (e.g. 0.5 m/s vs. 2 m/s), may be appropriate.

Figure 4C:
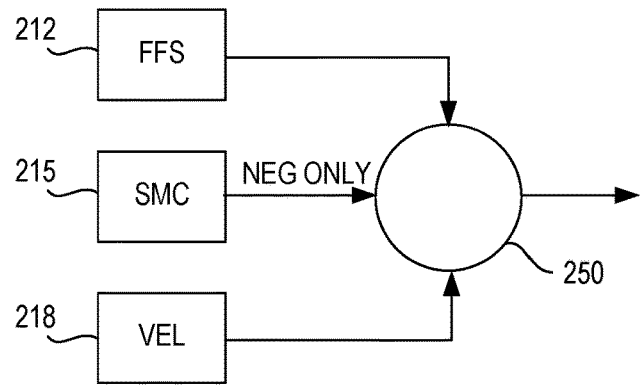

One approach to such relative velocity control is illustrated in FIG. 4C. In the velocity control scheme of FIG. 4C velocity controller 218 is used in conjunction with normal scaling from feed forward scaler 212. This causes the trailing platoon partner to better follow lead vehicle accelerations and/or torque increases than occurs during the dissolve state illustrated in FIG. 4B. At the same time, for safety purposes, braking requests and negative torque request from the sliding mode controller 215 may be utilized as appropriate by selector/adder 250 in a manner similar to the approach described above with respect to FIG. 4B.

Although particular platoon and gap controller architectures are illustrated in FIGS. 2 and 3, it should be appreciated that the specific architectures utilized may vary widely to meet the needs of any particular platooning or other automated vehicle control scheme. As will be apparent to those familiar with the art, the described controllers can be implemented algorithmically using software or firmware algorithms executing on one or more processors, using programmable logic, using digital or analog components or using any combination of the preceding.

Gap Regulation

To maintain a desired gap, braking will sometimes be required to slow a trailing vehicle to prevent the trailing vehicle from getting too close to a leading vehicle. Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill.

A wide variety of different mechanisms can be used as the retarder. The most common type of retarder (often referred to as a "Jake brake") alters the timing of the engine cylinder exhaust valves to cause compressed air to be released at or near top dead center of its compression stroke which extracts power from the powertrain thereby slowing the vehicle because the engine is effectively working as a compressor. Another type of retarder (often referred to as an exhaust brake) restricts the flow of exhaust gases through the exhaust system, thereby increasing the pressure within the exhaust system, which again forces the engine to work as a compressor in a manner that can help slow the vehicle. Other types of retarders sometimes used include hydraulic retarders and electric retarders. Regardless of the type of retarder used, they all share the same general purpose of serving as an additional or alternative mechanism for braking the vehicle.

Furthermore, even when normal valve timing is used, there will be some pumping losses and some frictional losses in the engine and elsewhere in the powertrain. Therefore, when no fuel is delivered, with the valves operating in the normal manner, the engine and the rest of the powertrain will impart a negative torque—which is referred to herein as a form of "engine braking." The amount of negative torque imparted by the engine/powertrain (the engine braking) without the use of a retarder can be controlled to some degree by controlling the amount (or lack) of fuel delivered to the cylinders, the transmission gear and sometimes other actuators. However, engine braking without the use of a retarder is inherently limited and therefore there are many driving situations in which it is desirable to provide more affirmative braking through the use of the foundation brakes and/or a retarder.

When affirmative braking is required, it is generally preferable to utilize a retarder rather than the foundation brakes whenever, and to the extent practical. There are several reasons for that general preference. One of the primary reasons for the preference relates to operational costs. Specifically, the foundation brakes wear with usage and wear relatively quickly with heavy usage. Repair and replacement of the brake pads and other foundation brake system components can be expensive and therefore frequent brake repair/replacements increases the overall operational costs. Another reason for the preference is that some retarders, such as Jake brakes, increase the temperature of the exhausts gases relative to the exhaust gas temperatures seen when air is effectively pumped through the cylinders with no fuel being combusted as may occur when the driver releases the accelerator pedal and begins coasting. This helps maintain higher exhaust system temperatures, which is useful for emissions control and tends to help fuel efficiency since it reduces the need to use additional fuel to heat the exhaust system after prolonged periods of braking or coasting. Retarders also tend to provide a smoother braking experience to the driver, which improves ride quality. Therefore, many conventional braking controller for use on heavy trucks are designed with a preference towards using a retarder in favor of the foundation brakes when and to the extent practical. Although retarder use is typically favored, retarders generally cannot slow the vehicle as much as the foundation brakes and their response is more varied and therefore retardation cannot always be used to the exclusion of foundation braking.

With platooning, the desired gap can be maintained the vast majority of the time during normal highway driving by managing the engine torque request alone. That is, more or less torque can be requested as appropriate at any time to maintain the desired gap. The torque request may be sent to the tractor's torque controller 152, which determines the amount of fuel that needs to be injected into each cylinder in order to deliver the requested torque under the current operating conditions (e.g., engine speed, transmission gear, etc.). When more power is needed, the torque request is increased. When less power is needed, the torque request is lowered. In practice, the torque request can even be negative to a degree since some amount of engine braking will inherently occur when no or a very small amount of fuel is injected.

There will, however, be times when more aggressive braking is required as part of platoon control. For example, if the lead truck actively brakes (e.g. when the driver presses the brake pedal) it will typically be desirable to actively brake the trailing vehicle in the same manner. In such circumstance the foundation brakes and/or the retarder are actuated to provide the necessary level of braking. Another example may be when the platoon is cruising downhill. When the grade is relatively steep, the driver of the front truck may release the accelerator pedal. Many powertrain controllers are designed to actively retard when the accelerator pedal is released in at least some operating conditions. One of the rationales for the retarding is to prevent the truck from "running away" (accelerating too much) as it coasts down a hill. When trucks are platooning, the trailing truck will often have to retard or brake more aggressively than the lead truck due to its lower aerodynamic drag.

One possible control scheme contemplates that when affirmative braking (i.e., braking beyond the negative torque provided by the aforementioned fuel cut-off type engine braking) is required, a brake controller is informed of the braking request and the brake controller takes responsibility for determining the amount and apportionment of braking to be applied by the retarder and foundation brakes respectively. Although this approach works well, experiments have shown that in some operational platooning conditions, such an approach tends to lead to use of the foundation brakes more often than might be desired.

One example scenario is when a truck platoon is traveling in a region of rolling hills. When the lead truck passes through a trough and encounters an area with a steeper grade, it may begin to slow down even though its torque request doesn't change or actually increases. At the same time, the following truck is at a shallower grade, flat or possibly still coasting downhill and begins to encroach on the front truck, thereby reducing the gap. The gap controller then takes action to cause the following truck to slow down in an effort to reestablish the desired gap. In some circumstances this may cause actuation of the foundation brakes to slow the trailing truck even though there will imminently be a need to increase torque significantly to prevent the front truck from running away from the trailing truck as the trailing truck subsequently encounters the hill. Such a scenario is undesirable for a number of reasons. Initially, the foundation brakes have been used at a time they probably weren't necessary, which is undesirable from a wear standpoint. Furthermore, passengers in the trailing truck will likely feel the actuation of the foundation brakes at a time they are not expected, which detracts from the user experience. Still further, braking just before additional torque is required slows the trailing vehicle at a time when the lead vehicle is increasing its torque request which increases the risk that the gap will grow bigger than desired and can even lead to the front truck running away from the trailing truck if the trailing truck is unable to recover quickly enough.

Figure 5A:
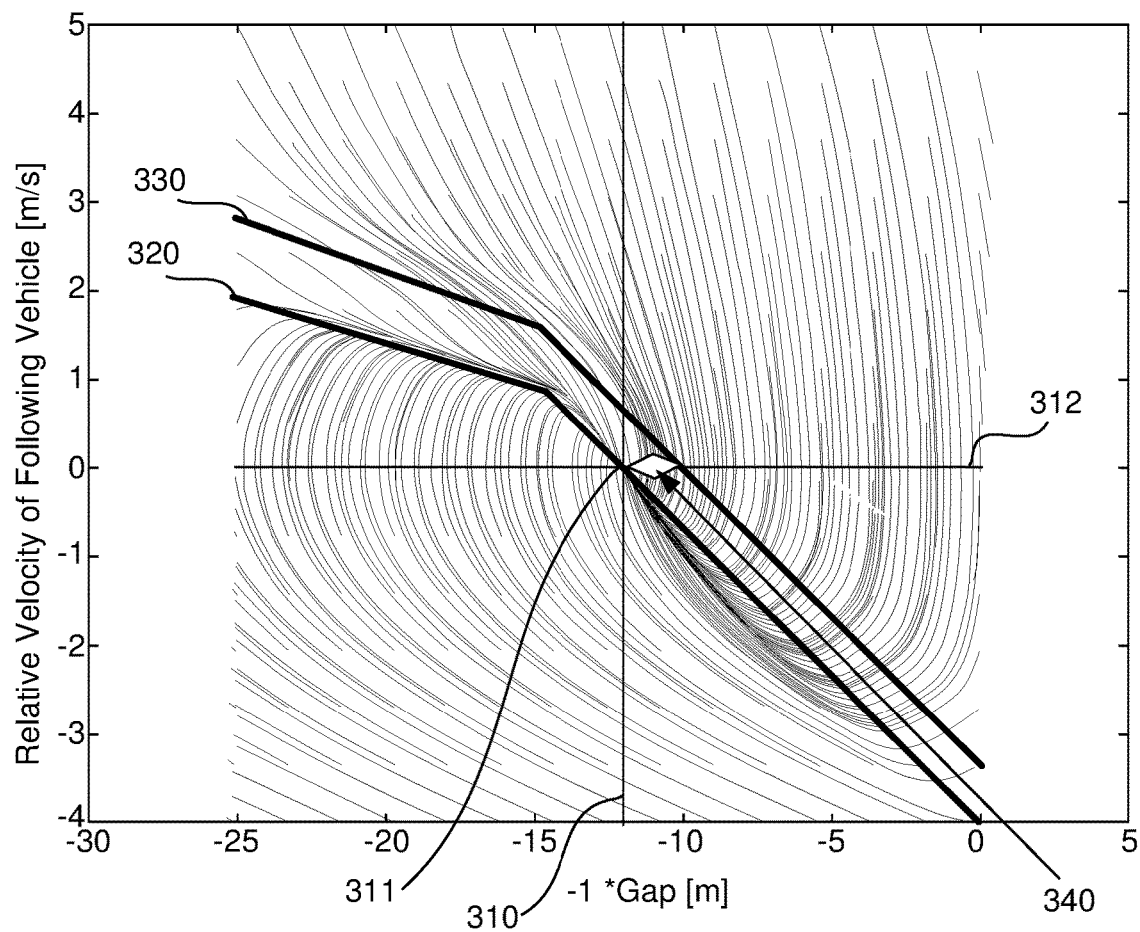
FIG. 5A is a state space diagram illustrating a control scheme in which torque requests and braking request are controlled towards different gaps in accordance with an embodiment of the invention.
Figure 5B:
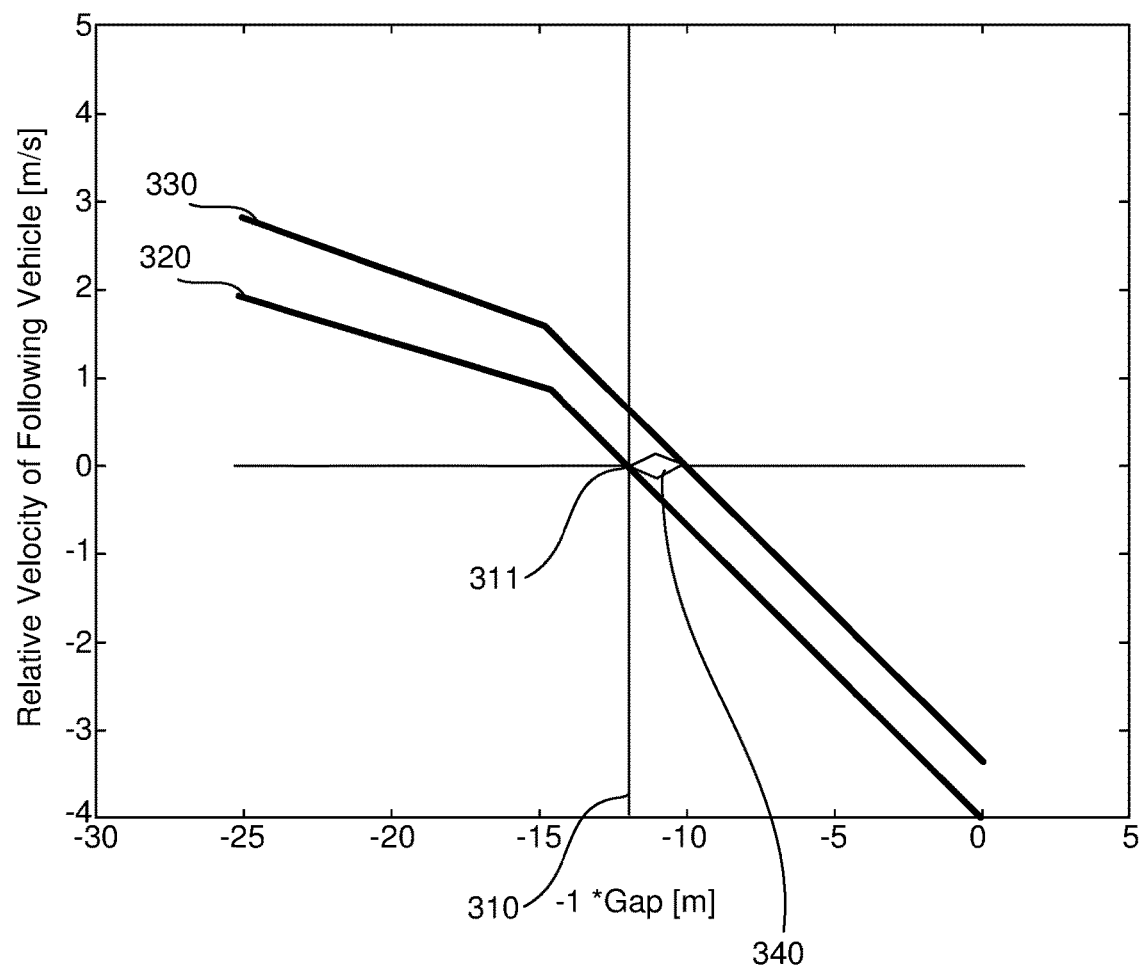
FIG. 5B is a reproduction of the state space diagram of FIG. 5A with the state transition lines removed for clarity.

The gap controller (gap regulator) architecture illustrated in FIG. 1 and described below helps mitigate these types of occurrences. In the illustrated embodiment, the gap regulator includes separate controllers (e.g. torque request controller 221 and brake request generator components 223) which are configured to control towards different gap control targets. The different control targets are illustrated in the state space diagrams of FIGS. 5A and 5B which show a control scheme in accordance with one specific implementation. More specifically, FIGS. 5A and 5B plot relative velocity between the vehicles (the Y-axis) vs. gap between the vehicles (the X-axis). FIGS. 5A and 5B also show a torque request controller target control line 320 and brake request controller target control line 330. FIG. 5A additionally shows representative transition paths from various points in the state space to the torque request target control line 320. Those transition lines are eliminated from FIG. 5B for clarity. In the illustrated embodiment, the nominal desired gap is 12 meters—which is represented by line 310. Thus, the target control point 311 is 12 meters with zero relative velocity, which is the point represented by the intersection of line 310 (12 meters gap) and line 312 (zero relative velocity).

The torque request controller component 221 of gap regulator 210 is configured to generate a torque request that is appropriate to control the gap in accordance with target control line 320. The torque request is then implemented by engine torque controller 152. As can be seen in FIGS. 5A and 5B, when the gap is larger than the desired gap, the rear truck is controlled to travel slightly faster than the front truck is traveling such that the relative velocity of the rear truck has a small positive value. As the rear truck draws closer to the lead truck, its relative velocity is reduced in a smooth manner until the gap is reduced to the target control point 311, at which point the relative velocity would be zero if perfect control were attained. If the rear truck gets closer than the desired gap, it is slowed so that it has a negative relative velocity relative to the lead truck to reestablish the desired gap.

For most open highway driving conditions, modulating the torque request alone is sufficient to control the gap appropriately without requiring the use of the foundation brakes. This is in part because the torque request can be negative to a certain degree without needing to actuate the foundation brakes through the use of engine braking and/or the retarder (if available). As mentioned above, when fuel is cut-off there will be some pumping losses and some frictional losses in the powertrain, so some level of negative torque can be provided while using normal valve timing by simply reducing the fuel charge appropriately. When larger negative torque is needed, the engine torque controller 152 can create larger negative torques by actuating the retarder and/or by taking other appropriate measures.

Separately, the brake request controller component 223 of gap regulator 210 is arranged to generate brake requests during normal operation that are generally arranged to maintain a different gap—specifically a smaller gap—than the torque request controller 221 targets. This difference in the gaps that the torque and brake request controllers control to is sometimes referred to herein as the gap tolerance 340. In general, brake requests 213 are not generated unless or until the gap is reduced at least the gap tolerance below the torque request target control line 320.

In the embodiment illustrated in FIGS. 5A and 5B, the brake request controller 223 is configured to control the gap in accordance with brake target control line 330 under normal operating condition. It can be seen that target brake control line 330 is above and to the right of torque target control line 320. Thus, for example, in the illustrated embodiment, the nominal desired gap for the brake request controller 223 at zero relative velocity is 10 meters—which is two meters less than the target control point 311 for the torque request controller 221. That two meter difference is the gap tolerance 340 at a relative velocity of zero. The target brake control line 330 controls towards smaller gaps at other relative velocities as well. Since the brakes can only be used to slow the vehicle, the effect of this difference is that the trailing truck will be allowed to creep in a relatively small amount (2 meters in the example) before the foundation brakes are actuated when the gap regulator 210 cannot maintain the desired gap through control of the torque request alone. When the desired gap can be restored by modulating the torque requests alone without crossing target brake control line 330, then the foundation brakes do not need to be used at all. This has the effect of safely maintaining a gap while reducing the probability that the foundation brakes will be deployed unnecessarily.

It should be appreciated that the specific shape of the target control lines 320 and 330 may vary widely in accordance with the design goals for any particular controller. And there is no need for the lines to be parallel. Thus, the gap tolerance 340 (which may be viewed as the amount of "creep" or "squish" that is permitted) may vary as a function of the length of the current gap, the relative velocities of the vehicles and/or optionally, any other factors deemed appropriate to a particular application. In general, the amount of creep permitted before actuating the brakes may be higher when the distances between the platooning vehicles is further—although that is not a requirement.

The approach described above with reference to FIGS. 5A and 5B works well to help reduce the occurrences of the foundation brakes being used unnecessarily. However, there may be driving circumstances in which it will be desirable to actuate the foundation brakes immediately—even when the gap is currently greater than the targeted braking gap defined by control line 330. A good example of such a scenario is when the lead vehicle affirmatively brakes by actuating its foundation brakes. In such scenarios it may sometimes be desirable to try to avoid the creep permitted by the approach illustrated in FIGS. 5A and 5B. One way to address that issue is to change the brake control line when certain events are detected such as the lead vehicle braking.

The platoon controller 110 can be informed of the lead vehicle braking event by a message received from the lead vehicle (e.g., through a DSRC link) that the lead vehicle is braking or about to brake, by a camera or other sensor that detect the actuation of the lead vehicle's brake lights, or in any other suitable manner. In some circumstances in which the lead truck is being driven under human control, the braking message may be initiated by a controller on the lead vehicle when the driver first begins to depress the brake pedal, which may be a brief moment before the foundation brakes on the lead vehicle are deployed. This allows the control of the trailing vehicle to be very responsive.

Figure 6:
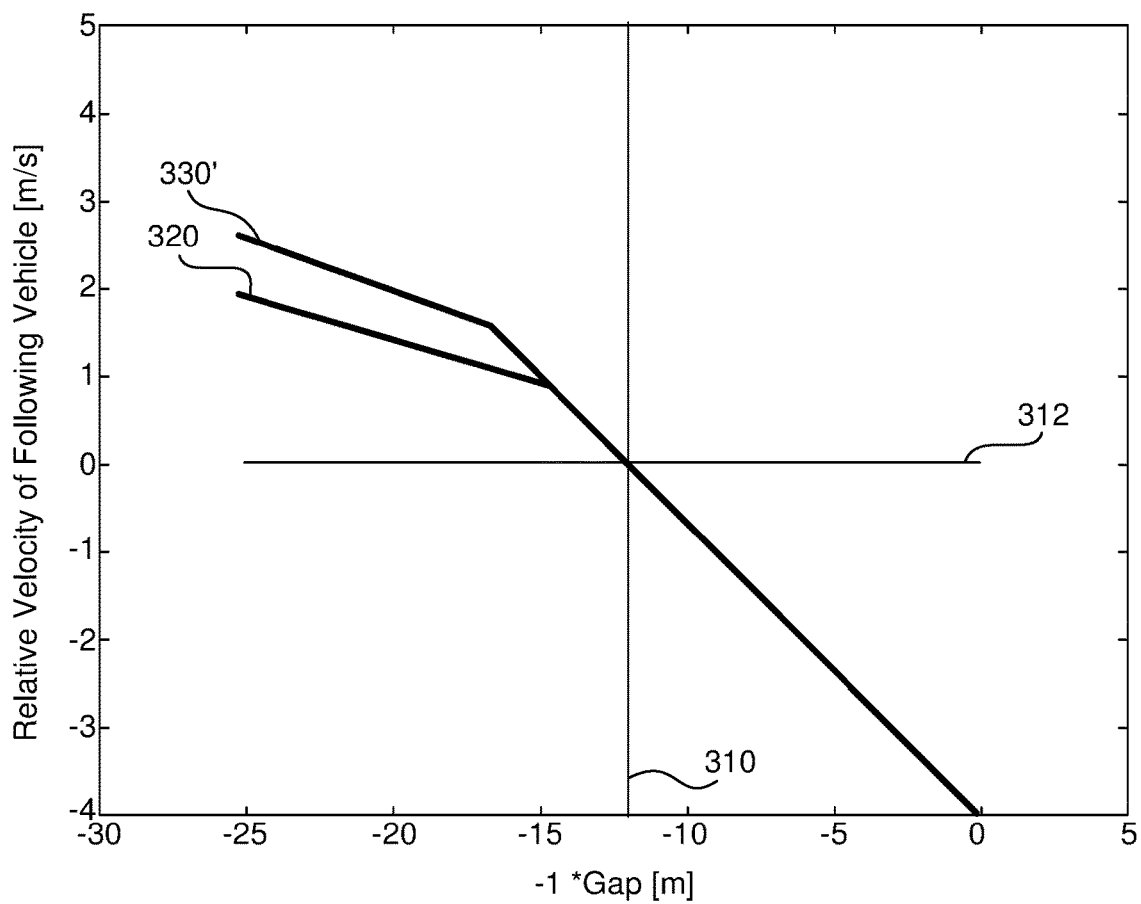
FIG. 6 is a state space diagram similar to FIG. 5B illustrating a scenario in which the braking request control is adjusted to coincide with the torque request control in a portion of the control space.

When a lead vehicle braking event is detected, the brake request controller can be changed to utilize different control parameters. By way of example, one representative alternative is illustrated in FIG. 6. In this embodiment, the braking parameters are adjusted so that brake request control line 330' coincides with a least a portion of the torque request control line 320. In the regions that coincides (which in the illustrated embodiments are regions corresponding to smaller gaps), the brake request controller 223 will seek to control to the same gap as the torque request controller 221. That is, the gap tolerance is changed to zero. This helps maintain the desired gap in times of affirmative lead vehicle braking which may provide a more desirable experience for passengers in the trailing vehicle.

Figure 7:
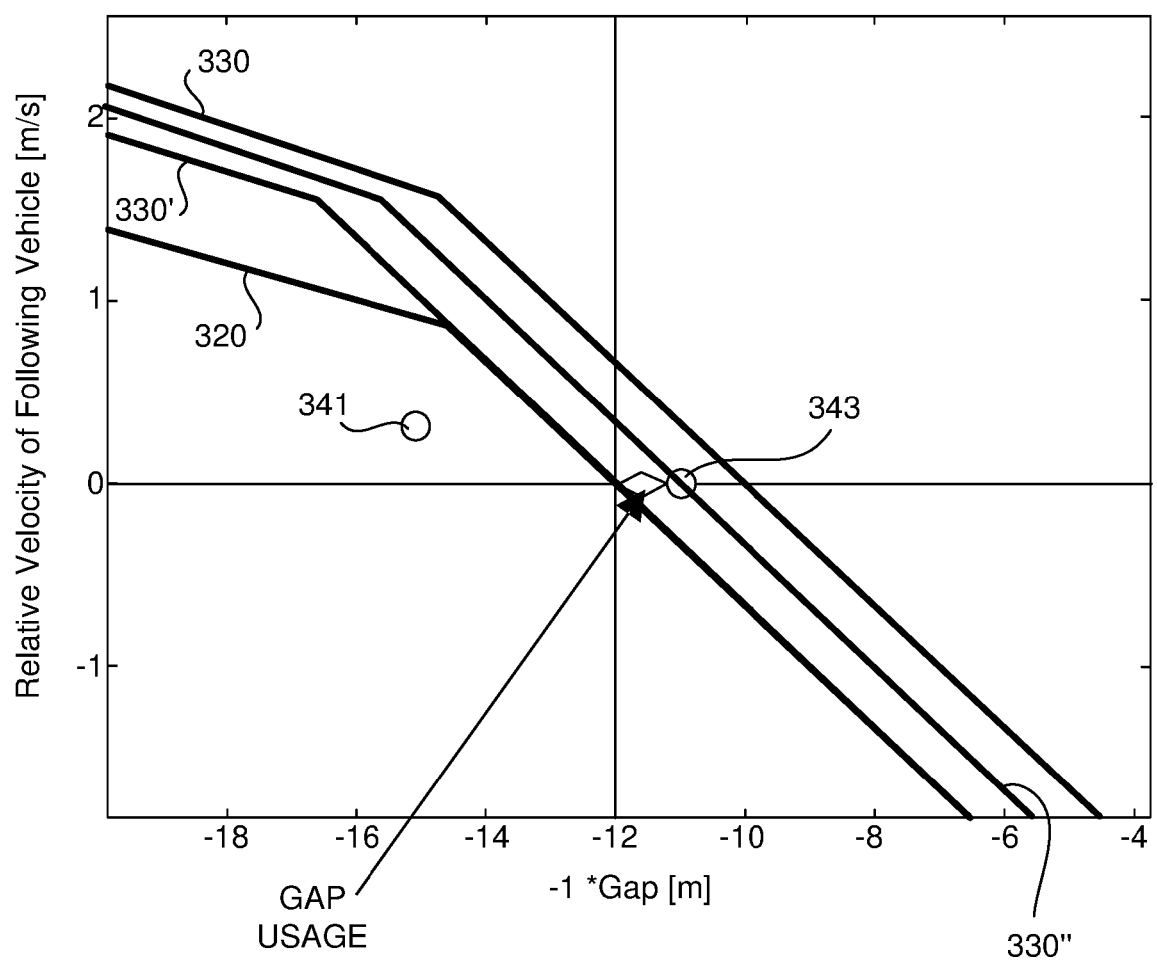
FIG. 7 is a state space diagram similar to FIG. 5B illustrating a gap usage adjusted braking request control scheme.

Although setting the gap tolerance to zero as illustrated in FIG. 6 works well in many operational circumstances, there may be operational braking situations in which it is not desirable to snap to coinciding control of the torque and braking requests. Some such circumstances will be described with reference to two specific operational points 341 and 343 shown in FIG. 7. Point 341 represents a state in which the gap is larger than the nominal target gap 311 and the relative velocity between the lead and trailing vehicles is lower than the relative velocity desired for that particular gap size. In such a scenario the brake request controller can maintain relatively smooth braking when the brake request control snaps to the control line 330' that coincides with the torque request control line.

Point 343 represents a state in which the gap is smaller than the nominal target gap 311 and the relative velocity between the vehicles is higher than desired for that particular gap size. In this state the gap controller is effectively using a portion of the allotted gap tolerance 340. This amount is sometimes referred to herein as the gap tolerance usage. It should be appreciated that the gap tolerance usage will vary with time as the gap controller seeks to control the trailing vehicle. In many circumstances the gap tolerance usage will be zero—as for example when the current state is somewhere along the torque request control line 320 or thereunder (e.g., as represented by point 341). In other transitory circumstances the gap usage may be lower than the permissible gap tolerance as represented by point 343. If the current operational state is a location along or above brake request control line 330, then the entire gap tolerance has been used.

Any time that a braking control target parameters switch occurs while the current operational state is at a position above the adjusted brake request control line 330', as represented by point 343, there would be a sudden braking event or a sudden increase in the level of braking as the controller attempts to increase the gap while braking. That may be considered acceptable and/or desirable in many circumstances since braking is expected. In other circumstances, the impact of such a change in the control parameters may be considered "over-braking" since the braking controller will move to affirmatively grow the gap/reduce relative speed to the new brake request control line 330'. In alternative embodiments, to eliminate such over-braking in circumstances in which a portion of the gap tolerance is already in use when the active braking initiates, the brake request controller can set a new gap tolerance equal to the lower of the default tolerance and current usage of the gap tolerance. When the current usage is less than the default tolerance, this has the impact of causing the brake request controller to control the brakes to an intermediate brake control line 330" which passes through the current state as best seen if FIG. 7.

In the illustrated embodiment the portions for the torque request control line 320 and the normal brake request control line 330 in a region within a few meters of the target gap 311 are parallel, with their separation corresponding to the gap tolerance. The active front vehicle braking brake request control line 330' is coincident with the torque request control line in the same region. The current gap tolerance based brake request control line 330" is also parallel with the torque request control line 320 in the same region, with the separation between 320 and 330" corresponding to the gap tolerance usage at the time that the brake request controller's control parameters are changed. Although all of the illustrated control lines are parallel in this region in the illustrated embodiment—this is not a requirement in all embodiments. Rather, the control algorithms used in these different scenarios may vary in any manner deemed appropriate by the designer. As such there can be a variety of implementations in which the respective control lines are not parallel.

Although the example of changing the brake request controller's control line in response to lead vehicle braking events is given, it should be appreciated that the brake request controller can change its characteristics in response to any designated triggering event. For example, the control characteristics can be changed in response to actuation of a retarder on the lead vehicle, actuation the foundation brakes on the trailing vehicle regardless of what is happening with the lead vehicle or any other circumstance desired.

Additionally, in various embodiments, the desired gap and/or the gap tolerance can be varied based on driving conditions. For example, when driving in areas of rolling hills or in heavy traffic areas, it may be desirable to increase the gap and/or the gap tolerance.

Although only a few embodiments of the inventions have been described in detail, it should be appreciated that the inventions may be implemented in many other forms without departing from the spirit or scope of the invention. The inventions have been described primarily in the context of at least partially automatically controlling a trailing truck in a pair of platooning trucks. However, it should be appreciated that the same concepts can be applied to any types of vehicles operating in adaptive cruise control modes or in any type of connected vehicle applications, and regardless of whether the host vehicle is operating in a partially or fully automated operating mode.

Although a particular gap regulator architecture has been shown, it should be appreciated that the nature of the controllers used to perform the described gap control can vary widely. In some described embodiments, separate torque and brake request generators provided. However, in other embodiments a single controller or control algorithm can be arranged to generate both requests. In some of the described embodiments, a gap regulator generates the torque and braking requests and separate torque and brake controllers are utilized to implement those requests. However, in other embodiments, the gap regulator or other controller can be arranged to both (a) determine the amount of torque and/or braking required; and (b) control the delivery of the desired torque and/or braking.

As will be apparent to those familiar with the art, the described controllers can be implemented algorithmically using software or firmware algorithms executing on one or more processors, using programmable logic, using digital or analog components or using any combination of the preceding.

In vehicles that include retarders, the retarder can be controlled by a torque controller responsive to the torque request, or the brake controller responsive to the brake request or both. Alternatively, the retarder can be controlled directly by the gap regulator when the gap regulator also controls the delivery of the desired torque and/or braking.

In other embodiments appropriate for use in vehicles that utilize a retarder, gap regulator can be arranged to send a separate retard request to a retard controller or other the engine control component that controls the retarder. In such embodiments, the retarder can be controlled towards a retarder target control line that is different than the torque request and brake target control lines. If separate retarder control is provided, the retarder target control line would typically be intermediate between the torque request and brake request target control lines so as to encourage engine braking before retarding and retarding before the use of wheel brakes.

Some vehicles (particularly heavy vehicles) utilize multiple retarders. If desired, the retarders can be controlled separately in the described manner.

In the detailed description above, it is assumed that the controlled power plant is an internal combustion engine, as for example a diesel engine. However, it should be appreciated that the described control approach can be utilized regardless of the nature of the power plant used to provide torque to drive the host vehicle. Therefore, the present embodiments should be considered illustrative and not restrictive and the invention is not to be limited to the details given herein, but may be modified within the scope and equivalents of the appended claims.

What is claimed is:

1. A method of controlling a first vehicle to at least partially automatically maintain separation from a second vehicle while driving, the first vehicle having a power plant and brakes, the method comprising:
    automatically controlling an output of the power plant during driving in accordance with a power plant output control scheme arranged to attain and maintain a first target gap between the first and the second vehicles; and
    automatically controlling the brakes during driving in accordance with a braking control scheme arranged to attain and maintain a second target gap during first selected operating conditions, the second target gap being shorter than the first target gap; and
    wherein the difference between the first and second target gaps is a gap tolerance; and
    wherein automatically controlling the brakes to maintain the second target gap during the first selected operating conditions causes braking requests to be generated during the first selected operating conditions only when the first vehicle has encroached upon the second vehicle by at least the gap tolerance relative to a targeted separation distance between the first and second vehicles dictated by the first control scheme at a current operational state.

2. A method as recited in claim 1 wherein the gap tolerance varies at least in part based on a current actual gap between the first and second vehicles.

3. A method as recited in claim 1 wherein the power plant is an engine and the controlled brakes are wheel brakes.

4. A method as recited in claim 1 wherein the first and second target gaps are longitudinal separations between the first and second vehicles.

5. A method as recited in claim 1 wherein:
    the first vehicle is a truck that includes a retarder; and
    the retarder is controlled at least in part based on a torque request generated by a torque request controller.

6. A method as recited in claim 5 wherein the brakes are wheel brakes and the retarder is also controlled in part by a brake controller that automatically controls the wheel brakes during driving.

7. A method of controlling a first vehicle to at least partially automatically maintain separation from a second vehicle while driving, the first vehicle having a power plant and brakes, the method comprising:
    automatically controlling an output of the power plant during driving in accordance with a power plant output control scheme arranged to attain and maintain a first target gap between the first and the second vehicles; and
    automatically controlling the brakes during driving in accordance with a braking control scheme arranged to attain and maintain a second target gap during first selected operating conditions, the second target gap being shorter than the first target gap; and
    wherein in at least some circumstances, when the first vehicle receives an indication that the second vehicle is braking, the braking control is switched to automatically control the brakes in a manner arranged to attain and maintain the first target gap rather than the second target gap.

8. A method of controlling a first vehicle to at least partially automatically maintain separation from a second vehicle while driving, the first vehicle having a power plant and brakes, the method comprising:
    automatically controlling an output of the power plant during driving in accordance with a power plant output control scheme arranged to attain and maintain a first target gap between the first and the second vehicles; and
    automatically controlling the brakes during driving in accordance with a braking control scheme arranged to attain and maintain a second target gap during first selected operating conditions, the second target gap being shorter than the first target gap; and
    wherein in at least some circumstances, when the first vehicle receives an indication that the second vehicle is braking, the braking control is switched to automatically control the brakes in a manner arranged to attain and maintain a current gap rather than the second target gap.

9. A method of controlling a first vehicle to at least partially automatically maintain separation from a second vehicle while driving, the first vehicle having a power plant and brakes, the method comprising automatically controlling an output of the power plant during driving in accordance with a power plant output control scheme arranged to attain and maintain a first target gap between the first and the second vehicles, and automatically controlling the brakes during driving in accordance with a braking control scheme arranged to attain and maintain a second target gap during first selected operating conditions, the second target gap being shorter than the first target gap, and wherein:

the power plant output control scheme has a target output control line that defines a relative velocity versus gap relationship desired for use in controlling the first vehicle to attain the first target gap;

the braking control scheme has a target braking control line that defines a relative velocity versus gap relationship desired for use in controlling braking of the first vehicle to attain the second target gap; and identifying a circumstance in which (i) the second vehicle is or will imminently be braking, and (ii) an actual current relative velocity of the first vehicle relative to the second vehicle is less than or equal to a targeted relative velocity defined by the target output control line at an actual current gap between the first and second vehicles; and changing the braking control scheme to automatically control the brakes in a manner arranged to attain and maintain the first target gap rather than the second target gap.

10. A method of controlling a trailing vehicle to at least partially automatically maintain separation from a leading vehicle, the trailing vehicle having an engine and wheel brakes, the method comprising:

automatically controlling an output of the engine during driving in accordance with an engine control scheme arranged to attain and maintain a first target gap between the leading and trailing vehicles, the engine output control scheme having a target engine output control line that defines a relative velocity versus gap relationship desired for use in controlling the trailing vehicle to attain the first target gap; and automatically controlling the wheel brakes during driving in accordance with a braking control scheme during first selected operating conditions arranged to attain and maintain a second target gap between the leading and trailing vehicles, the braking control scheme having a target braking control line that defines a relative velocity versus gap relationship desired for use in controlling braking of the trailing vehicle to attain the second target gap, wherein the second target gap is shorter than the first target gap and wherein the difference between the first and second control lines is a gap tolerance; and wherein automatically controlling the wheel brakes in a manner arranged to attain and maintain the second target gap during the first selected operating conditions causes wheel brake braking requests to be generated during the first selected operating conditions only when the trailing vehicle has encroached upon the leading vehicle by at least the gap tolerance relative to a desired gap defined by the target engine output control line at a current actual relative velocity of the trailing vehicle relative to the leading vehicle.

11. A method as recited in claim 10 further comprising:

identifying a first circumstance in which (i) the leading vehicle is or will imminently be braking, and (ii) an actual current relative velocity of the trailing vehicle relative to the leading vehicle is less than or equal to a targeted relative velocity defined by the target engine output control line at an actual current gap between the leading and trailing vehicles; and changing the braking control scheme for the trailing vehicle in response to the identification of the first circumstance to automatically control the brakes for the trailing vehicle in a manner arranged to attain and maintain the first target gap rather than the second target gap.

12. A method as recited in claim 10 further comprising:

identifying a first circumstance in which (i) the leading vehicle is or will imminently be braking, and (ii) an actual current relative velocity of the trailing vehicle relative to the leading vehicle is between a first targeted relative velocity defined by the target engine output control line at an actual current gap between the leading and trailing vehicles and a second targeted relative velocity defined by the target braking control line at the actual current gap; and changing the braking control scheme for the trailing vehicle in response to the identification of the first circumstance to automatically control the brakes for the trailing vehicle in a manner arranged to attain and maintain the third target gap rather than the second target gap, the third target gap being intermediary between the first and second target gaps.

13. A method as recited in claim 10 wherein:

the leading and trailing vehicles are trucks, and the trailing vehicle includes a retarder; and the retarder is controlled at least in part based on a torque request generated by a torque request controller.

14. A platoon controller for at least partially automatically controlling a host vehicle to attain and maintain a first target gap separation between the host vehicle and a second vehicle while the host vehicle is driving, the platoon controller comprising:

a torque request controller configured to determine torque requests suitable for attaining and maintaining the first target gap between the host and second vehicles while the host vehicle is driving under first selected operating conditions;

a brake request controller configured to determine brake requests suitable for attaining and maintaining a second target gap between the host and second vehicles while the host vehicle is driving under the first selected operating conditions, the second target gap being shorter than the first target gap; and wherein during driving under the first selected operation condition, the torque request controller outputs torque requests based on the first target gap and the brake request controller outputs brake requests based on the second target gap wherein the difference between the first and second target gaps is a gap tolerance; and wherein automatically controlling the brakes to maintain the second target gap during the first selected operating conditions causes braking requests to be generated during the first selected operating conditions only when the first vehicle has encroached upon the second vehicle by at least the gap tolerance relative to a targeted separation distance between the first and second vehicles dictated by the first control scheme at a current operational state.

15. A platoon controller for at least partially automatically controlling a host vehicle to attain and maintain a first target gap separation between the host vehicle and a second vehicle while the host vehicle is driving, the platoon controller comprising:

a torque request controller configured to determine torque requests suitable for attaining and maintaining the first target gap between the host and second vehicles while the host vehicle is driving under first selected operating conditions;

a brake request controller configured to determine brake requests suitable for attaining and maintaining a second target gap between the host and second vehicles while the host vehicle is driving under the first selected operating conditions, the second target gap being shorter than the first target gap; and wherein during driving under the first selected operation condition, the torque request controller outputs torque requests based on the first target gap and the brake request controller outputs brake requests based on the second target gap; and wherein the torque request controller and the brake request controller are components of a sliding mode controller.

16. A platoon controller for at least partially automatically controlling a host vehicle to attain and maintain a first target gap separation between the host vehicle and a second vehicle while the host vehicle is driving, the platoon controller comprising:

a torque request controller configured to determine torque requests suitable for attaining and maintaining the first target gap between the host and second vehicles while the host vehicle is driving under first selected operating conditions;

a brake request controller configured to determine brake requests suitable for attaining and maintaining a second target gap between the host and second vehicles while the host vehicle is driving under the first selected operating conditions, the second target gap being shorter than the first target gap; and wherein during driving under the first selected operation condition, the torque request controller outputs torque requests based on the first target gap and the brake request controller outputs brake requests based on the second target gap; and wherein the brake request controller is further configured to, responsive to reception of an indication that the second vehicle is braking, determine a brake request suitable for attaining and maintaining the first target gap rather than the second target gap during second selected operating conditions.

17. A platoon controller for at least partially automatically controlling a host vehicle to attain and maintain a first target gap separation between the host vehicle and a second vehicle while the host vehicle is driving, the platoon controller comprising:

a torque request controller configured to determine torque requests suitable for attaining and maintaining the first target gap between the host and second vehicles while the host vehicle is driving under first selected operating conditions;

a brake request controller configured to determine brake requests suitable for attaining and maintaining a second target gap between the host and second vehicles while the host vehicle is driving under the first selected operating conditions, the second target gap being shorter than the first target gap; and wherein during driving under the first selected operation condition, the torque request controller outputs torque requests based on the first target gap and the brake request controller outputs brake requests based on the second target gap; and wherein the brake request controller is further configured to determine a brake request suitable for attaining and maintaining a third target gap during second selected operating conditions, the third target gap being intermediary between the first and second target gaps.

18. A platoon controller configured for use on a truck having an engine, a retarder and wheel brakes, for at least partially automatically controlling the truck to attain and maintain a first target gap separation between the truck and a second vehicle while the truck is driving, the platoon controller comprising:

a torque request controller configured to determine torque requests suitable for attaining and maintaining the first target gap between the truck and second vehicle while the truck is driving under first selected operating conditions;

a brake request controller configured to determine brake requests suitable for attaining and maintaining a second target gap between the truck and second vehicle while the truck is driving under the first selected operating conditions, the second target gap being shorter than the first target gap; and wherein during driving under the first selected operation condition, the torque request controller outputs torque requests based on the first target gap and the brake request controller outputs brake requests based on the second target gap; and wherein the torque requests generated by the torque request controller are configured to be used in conjunction with control of the engine and retarder but not the wheel brakes; and wherein the brake requests generated by the brake request controller are configured to be used in conjunction with control of the wheel brakes.

19. A truck having an engine, a retarder and wheel brakes and a platoon controller as recited in claim 18.

* * * * *